United States Patent [19]
Coleman et al.

[11] Patent Number: 5,262,484
[45] Date of Patent: Nov. 16, 1993

[54] AZLACTONE GRAFT COPOLYMERS

[75] Inventors: Patrick L. Coleman, Minneapolis; Thomas A. Kotnour, Faribault; Richard J. Rolando, Oakdale, all of Minn.

[73] Assignee: Minnesota Mining and Manufacturing Company, St. Paul, Minn.

[21] Appl. No.: 942,352

[22] Filed: Sep. 9, 1992

Related U.S. Application Data

[63] Continuation of Ser. No. 502,617, Mar. 30, 1990, abandoned, which is a continuation-in-part of Ser. No. 335,284, Apr. 10, 1989, Pat. No. 5,013,795.

[51] Int. Cl.$^5$ .............. C08F 255/02; C08F 263/04; C08F 279/02; C08F 8/18; C08F 8/30; C08F 8/32; C08F 8/36; C08L 51/04; C08L 51/06; A61K 37/02; G01N 33/545

[52] U.S. Cl. ..................... 525/204; 525/70; 525/80; 525/87; 525/52; 525/53; 525/206; 525/222; 525/227; 525/232; 525/240; 525/241; 525/263; 525/279; 525/284; 525/302; 525/308; 525/315; 525/319; 525/320; 525/322; 525/324; 525/353; 525/359.1; 525/359.3; 525/375; 525/379; 525/384; 525/385; 525/386; 525/73; 427/2; 436/531; 514/2; 428/461; 428/462

[58] Field of Search .............. 525/263, 279, 284, 302, 525/308, 315, 319, 320, 322, 324, 70, 80, 87, 204, 206, 222, 227, 232, 240, 241, 353, 359.1, 359.3, 375, 379, 384, 385, 386; 436/531; 514/2; 427/2

[56] References Cited

U.S. PATENT DOCUMENTS

| | | | |
|---|---|---|---|
| 3,177,270 | 4/1965 | Jones et al. | 260/878 |
| 3,488,327 | 1/1970 | Kollinsky et al. | |
| 3,511,894 | 5/1970 | Markert | 260/875 |
| 3,583,950 | 6/1971 | Kollinsky et al. | |
| 3,598,790 | 8/1971 | Kollinsky et al. | 260/78.3 |
| 3,700,609 | 10/1972 | Tregear et al. | 436/531 |
| 4,003,874 | 1/1977 | Ide et al. | 260/42.18 |
| 4,146,529 | 3/1979 | Yamamoto et al. | 260/42.18 |
| 4,228,255 | 10/1980 | Fujimoto et al. | 525/288 |
| 4,297,452 | 10/1981 | DeKoch et al. | 525/367 |
| 4,304,705 | 12/1981 | Heilmann et al. | 260/30.4 N |
| 4,619,867 | 10/1986 | Charbonneau et al. | 428/355 |
| 4,695,608 | 9/1987 | Engler et al. | |
| 4,737,560 | 4/1988 | Heilman et al. | |
| 4,902,749 | 2/1990 | Akkapeddi et al. | 525/279 |
| 4,978,724 | 12/1990 | Clark | 436/531 |
| 4,980,299 | 12/1990 | Batz et al. | 436/531 |
| 5,013,795 | 5/1991 | Coleman et al. | 525/279 |

FOREIGN PATENT DOCUMENTS

| | | |
|---|---|---|
| 1-081876 | 3/1989 | Japan . |
| 1393693 | 5/1975 | United Kingdom . |

OTHER PUBLICATIONS

Clin. Chem. 1976, 22, 1243 (Wisdom).
J. Poly. Sci., Poly. Lett. Ed. 1983, 21, 487 (Chujo et al.).
J. Colloid and Interface Sci. 1985, 106, 438 (Laveille et al.).
Colloid and Polymer Sci. 1978, 256, 1155 (Pennings).
Plastics Compounding, Jan./Feb. 1986, pp. 44–53 (Eise et al.).
Plastics Compounding, Sep./Oct. 1986, pp. 24–39 (Frund et al.).
Polymer Prep., 1986, 27, 89 (Sahar).
Biomedical Applns. of Immobilized Enzymes, vol. 2, T. M. S. Chang, Ed. Plenum Publishing Corp., (Engvall).

Primary Examiner—Vasu S. Jagannathan
Attorney, Agent, or Firm—Gary L. Griswold; Walter N. Kirn; Paul W. Busse

[57] ABSTRACT

Graft copolymers and processes for the preparation thereof are provided. The copolymers comprise a base polymer having grafted thereto a monomeric 2-alkenyl azlactone. The surface properties of the graft copolymers can be modified by binding thereto nucleophilic reagents comprising further functional groups with desired properties. Further, the amount of azlactone available at the surface of a graft copolymer for binding to such nucleophilic reagents can be controlled by selecting a surface against which the graft copolymer is formed. The graft copolymers exhibit desirable thermoplastic, melt flow, and adhesion properties and are particularly useful for immobilizing proteins. Methods of immunoassay based on the immobilization of proteins are also disclosed. Another utility of the graft copolymers involves the compatibilizing of immiscible polymer blends.

51 Claims, 1 Drawing Sheet

AZLACTONE GRAFT COPOLYMERS

CROSS REFERENCE TO RELATED APPLICATION

This is a continuation of application No. 07/502,617 filed Mar. 30, 1090 now abandoned is a continuation-in-part of U.S. Ser. No. 07/335,284, filed on Apr. 10, 1989, now U.S. Pat. No. 5,013,795.

BACKGROUND OF THE INVENTION

Technical Field

This invention relates to continuous processes using wiped-surface reactors for free-radical graft polymerization, and to graft copolymers thereby produced.

In another aspect, this invention relates to azlactones and copolymers thereof. In yet another aspect, this invention relates to the immobilization of proteins on synthetic polymers and more particularly to methods of immunoassay based on such binding. This invention also relates to polymers with modified surface properties and to methods of modifying the surface properties of polymers. This invention also relates to polymer blends.

Description of the Related Art

The processing and/or production of polymeric resins using wiped-surface reactors such as screw extruders and twin-screw extruders is well known (such processing is often referred to as reactive extrusion). Twin-screw extruders and their use in continuous processes such as graft polymerization, alloying, bulk polymerization of vinyl monomers, and condensation and addition reactions are generally described in *Plastics Compounding*, Jan./Feb. 1986, pp. 44-53 (Eise et al.) and Plastics Compounding, Sept./Oct. 1986, pp. 24-39 (Frund et al). Graft reactions are said to be carried out by first melting a polymeric species in the initial stages of an extruder, injecting a peroxide catalyst into the extruder, and mixing in a monomer under high shear conditions. Advantages of the twin-screw extrusion process are said to include narrow distribution of molecular weight, improved melt-flow properties, consistent process control, and continuous processing.

Graft polymerization reactions of polyolefins with various monomers using wiped-surface reactors are known. Such grafting is said to be useful in providing a polymer adduct with functionality to allow further modification of structure and properties, and general mechanistic proposals regarding the formation of these "mechanochemically synthesized" adducts are discussed in connection with the grafting of maleic anhydride onto polypropylene in *Polymer Prep.*, 1986, 27, 89 (Al-Malaika). Particular free radical graft polymerization reactions have been reported. For example, U.S. Pat. No. 3,177,270 (Jones et al.) discloses a process of preparing graft copolymers by malaxing an olefin polymer at a temperature between 110° C. and 250° C. while contacting the polymer with a minor proportion of a mixture comprising a monovinyl aromatic compound and optionally one or more other monomers such as acrylic acid, methacrylic acid, acrylonitrile, methyl methacrylate, methacrylonitrile, or maleic anhydride, the mixture having dissolved therein an organic peroxide. British Pat. No. 1,393,693 (Steinkamp et al.) discloses the use of a single-screw extruder to graft monomers such as maleic anhydride and acrylic acid onto polyolefins such as polypropylene in the presence of a suitable free radical initiator such as an organic peroxide The product graft copolymers are said to have a melt flow rate (MFR) of at least 50% greater than the MFR of the base polymer.

U.S. Pat. No. 4,003,874 (Ide et al.) discloses modified polyolefins obtained by adding an unsaturated carboxylic acid or an anhydride thereof and an organic peroxide to a polyolefin and melting these components in an extruder. The polyolefin so obtained adheres to glass fibers.

U.S. Pat. No. 4,146,529 (Yamamoto et al.) discloses a process for the production of modified polyolefins by combining a polyolefin with one or more carboxylic acids or their anhydrides in the presence of a radical producing agent in an extruder and in the presence of an organosilane.

U.S. Pat. No. 4,228,255 (Fujimoto et al.) discloses a method for crosslinking a polyolefin, the polyolefin being a low density polyethylene or a polyolefin mixture containing a low density polyethylene, comprising reacting the polyolefin with an organic silane and an organic free radical initiator to form a saline-grafted polyolefin, then mixing the saline-grafted polyolefin with a silanol condensation catalyst. The mixture is extruded with heating in a single-screw extruder to obtain a crosslinked polyethylene.

Monomeric 2-alkenyl-1,3-oxazolin-5-ones (which compounds and homologs thereof are referred to herein as 2-alkenyl azlactones) and copolymers thereof are known. Copolymers of 2-alkenyl azlactones and olefinically unsaturated monomers and coatings thereof are disclosed in U.S. Pat. No. 3,583,950 (Kollinsky et al.). Also, copolymers consisting essentially of a 2-alkenyl azlactone and an acrylic acid ester, and copolymerization thereof with vinylidene compounds having at least one hydroxyl group are disclosed in U.S. Pat. Nos. 3,488,327 and 3,598,790 (both to Kollinsky et al.). U.S. Pat. No. 4,695,608 (Engler et al.) discloses a bulk polymerization process for free radical polymerization of a vinyl monomer and a monomeric alkenyl azlactone or a macromolecular monomer with a molecular weight of less than about 30,000 in a wiped surface reactor such as a twin-screw extruder. Free radical initiator systems comprising a combination of reagents are useful in the process. Incorporation of alkenyl azlactones into acrylate pressure-sensitive adhesives improves the adhesives. Also disclosed in this patent are methods of preparation of 2-alkenyl azlactone monomers.

Among the myriad properties of some synthetic polymers is their ability to reversibly bind proteins. Many techniques for assay of protein-containing substrates are based on such binding. Enzyme linked immunosorbent assay, described in "Biomedical Applications of Immobilized Enzymes", Vol. 2, T. M. S. Chang, Ed. Plenum Publishing Corp., (Engvall) is but one such technique. ELISA and other enzyme immunoassay techniques such as those described in *Clin. Chem.* 1976, 22, 1243 (Wisdom) techniques generally use a material such as glass, polycarbonate, or polystyrene as a solid-phase immune adsorbent, which immobilizes one member of an immunological pair. The subsequent assay relies on competitive binding of the other member of the immunological pair in labeled and unlabeled form, to the immobilized member. One recognized disadvantage of the use of such techniques is that the immobilized protein is only physically adsorbed to the immune adsorbent such that adsorbed protein can be washed off to various degrees by rinsing or contact with aqueous buffer solutions. A decrease in assay accuracy, precision, and sensitivity can result from such "leakage" of the adsorbed protein.

SUMMARY OF THE INVENTION

This invention provides a graft copolymer comprising a poly-alpha-olefin base polymer having grafted thereto a monomeric 2-alkenyl azlactone of Formula I

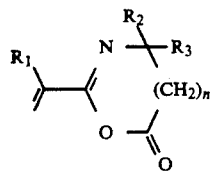

wherein
- $R_1$ is hydrogen, or methyl;
- $R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and
- n is an integer 0 or 1.

Suitable base polymers include poly-alpha-olefins that undergo substantial crosslinking under polymer melt conditions in the presence of a free radical initiator, and poly-alpha-olefins that do not undergo substantial crosslinking under polymer melt conditions in the presence of a free radical initiator.

This invention also provides polymer blends. One class of polymer blends of this invention is polymer blends comprising: (i) a graft copolymer of the invention as described above in an amount effective to impart to the blend the reactivity of the azlactone moiety, and (ii) the base polymer of the graft copolymer. Another class of polymer blends of this invention is compatibilized polymer blends comprising an immiscible polymer blend in intimate admixture with an amount of a graft copolymer of the invention effective to increase the tensile strength of the immiscible polymer blend.

This invention also provides processes for preparing the azlactone graft copolymers described above. One such process comprises the steps of:
(1) feeding to a reactor materials comprising
 (a) a poly-alpha-olefin base polymer
 (b) an effective amount of a free radical initiator system comprising one or more free radical initiators; and
 (c) a monomeric 2-alkenyl azlactone as described above,
wherein all materials are substantially free of oxygen;
(2) reacting the materials in the reactor to provide a graft copolymer comprising the base polymer with 2-alkenyl azlactone moieties grafted thereon; and
(3) withdrawing the graft copolymer from the reactor.

Preferably, in instances where the base polymer is a poly-alpha-olefin that does not undergo substantial crosslinking under polymer melt conditions in the presence of a free radical initiator, the base polymer is fed to the reactor in a region of the reactor preceding or coincident with the region in which the initiator system is fed and the monomeric 2-alkenyl azlactone is fed to the reactor in a region of the reactor subsequent to the region in which the initiator is fed. In instances where the poly-alpha-olefin base polymer undergoes substantial crosslinking under polymer melt conditions in the presence of a free radical initiator, the base polymer and the initiator are preferably fed to the reactor in a region preceding the region in which the monomeric 2-alkenyl azlactone is fed, but at a temperature such that crosslinking of the base polymer is minimized or prevented prior to the addition of the monomeric 2-alkenyl azlactone.

A preferred embodiment of the process of the invention involves the use of at least two free radical initiators to minimize degradation of the base polymer and maximize the number of grafted 2-alkenyl azlactone moieties. The desired thermoplastic, melt-flow, adhesion, and protein binding properties of the product graft copolymer can thus be optimized.

Further, the invention provides a method of immunoassay comprising the steps of:
1) treating an article comprising an azlactone graft copolymer as described above with one member of an immunological pair;
2) incubating the treated article with a solution suspected of containing the second member of the immunological pair; and
3) determining the amount of the second member of the immunological pair present in the solution.

This invention also provides a forming method for controlling the amount of grafted azlactone at the surface of a composition comprising a graft copolymer of the invention, comprising the steps of:
(1) selecting a surface that is made of a material that will control the amount of grafted azlactone at the surface of the composition;
(2) forming the composition in a molten state against the surface selected in step (1); and
(3) cooling the composition to the solid state.

The graft copolymers of the invention exhibit desirable thermoplastic, melt flow, and adhesion properties. Moreover, by virtue of the grafted azlactone moieties, the graft copolymers of the invention are useful for irreversibly binding (e.g., immobilizing) proteins and other nucleophilic reagents such as alcohols, amines, thiols, and the like. Particularly useful are immobilized reagents that further comprise moieties capable of modifying the surface properties of the graft copolymer. Furthermore, the polymer blends of the invention and the forming method of the invention allow one to finely tune the amount of azlactone available at the surface of a graft copolymer for binding to such reagents, and to reduce the total amount of azlactone used in a process of the invention. The compatibilized blends of the invention have tensile strength greater than that of the immiscible blend and greater than that of the graft copolymers of the invention, thereby affording a means of improving the tensile strength of an immiscible polymer blend.

DETAILED DESCRIPTION OF THE INVENTION

Figure 1:
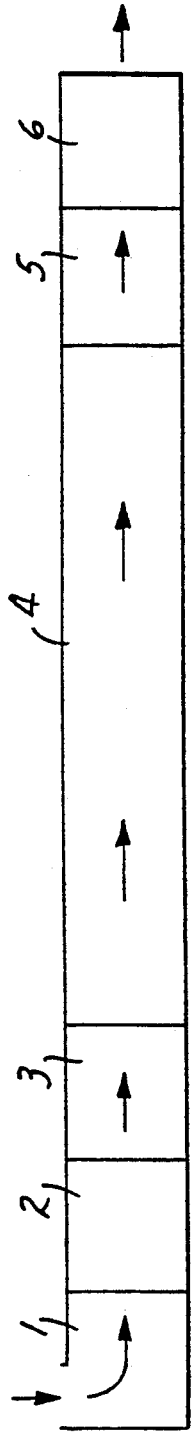
FIG. 1 is an exemplary flow diagram of the process of the invention. Ancillary equipment known to those skilled in the art, such as pumps and valves, has not been illustrated, and secondary process streams such as utility lines (e.g., cooling water) have been omitted.

A graft copolymer of the invention comprises a polyolefin base polymer and a 2-alkenyl azlactone moiety grafted thereto via the alkenyl group. Suitable base polymers include poly-alpha-olefins that do not undergo substantial crosslinking under polymer melt conditions in the presence of a free radical initiator, i.e., the rates of crosslinking and chain extension of the base polymer are slow relative to the rate of degradation by chain scission, such that there is net degradation of polymer molecular weight under polymer melt conditions in the presence of a free radical initiator, such as under the thermal extrusion conditions described in detail below. This class of polymers is known to those skilled in the art and includes polymers such as polymethylmethacrylate, poly-4-methylpentene, polypropylene, polybutylene, polystyrene and the like. Poly-alpha-olefin base polymers that do undergo substantial crosslinking under polymer melt conditions in the presence of a free radical initiator are also suitable. This class of polymers is known to those skilled in the art and includes polyolefins such as polyethylene and polybutadiene, and copolymers such as ethylene/vinyl acetate copolymer. Base polymers of virtually any molecular weight are suitable. For example, polypropylenes with a molecular weight of 40,000 to about 500,000 are suitable. Likewise, base polymers with a wide range of melt index values (e.g., from about 0.1 to about are suitable.

The 2-alkenyl azlactone monomers that can be grafted to the base polymer are known compounds, their synthesis being described for example in U.S. Pat. No. 4,304,705 (Heilmann et al.), the disclosure of which is incorporated herein by reference.

Suitable 2-alkenyl azlactones include:
2-ethenyl-1,3-oxazolin-5-one,
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4,4-dimethyl-1,3-oxazolin-5-one,
2-isopropenyl-4,4-dimethyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-4-methyl-4-phenyl-1,3-oxazolin-5-one,
2-isopropenyl-4-methyl-4phenyl-1-1,3-oxazolin-5-one,
2-isopropenyl-4-methyl-4-benzyl-1,3-oxazoline-5-one, and
2-ethenyl-4,4-pentamethylene-1,3-oxazolin-5-one, The preferred 2-alkenyl azlactones include 2-ethenyl-4,4-dimethyl-1,3-oxazolin-5-one (referred to herein as VDM) and 2-isopropenyl-4,4-dimethyl-1,3-oxazolin-5-one (referred to herein as IDM).

A graft copolymer of the invention comprises an amount of grafted 2-alkenyl azlactone effective to impart to the graft copolymer the reactivity of the azlactone moiety. Since as described in detail below the graft copolymers of the invention can be treated such that the surface density of the azlactone is greater than the bulk density, very small amounts of azlactone can be sufficient. As little as about 0.001% by weight of grafted 2-alkenyl azlactone based on the weight of the base polymer can be an effective amount for some applications. Preferably, however, a graft copolymer of the invention comprises about 0.1% to about 20%, more preferably 0.5 to about 10% by weight of grafted 2-alkenyl azlactone. In a process of the invention as described below it is preferred to use like quantities of 2-alkenyl azlactone, i.e., as little as about 0.001%, preferably about 0.1 to about 20% or more by weight, more preferably 0.5 to about 10% by weight based on the weight of the base polymer.

In a process of the invention, the base polymer and the 2-alkenyl azlactone are reacted in a reactor in the presence of an initiator system comprising one or more free radical initiators. The initiator system serves to initiate free radical grafting of the 2-alkenyl azlactone. In a process of the invention involving a poly-alpha-olefin base polymer that does not undergo substantial crosslinking under polymer melt conditions in the presence of a free radical initiator, the base polymer is degraded in the reactor. It has been found, however, that the selection of an appropriate initiator system affords a product graft copolymer that better retains the molecular weight of the base polymer.

Many initiators are known. Suitable initiators include: hydroperoxides such as cumene, t-butyl, and t-amyl hydroperoxides, and 2,5-dihydroperoxy-2,5-dimethylhexane; dialkyl peroxides such as di-t-butyl, dicumyl, and t-butyl cumyl peroxides, 2,5-dimethyl-2,5-di(t-butylperoxy)hexane, and 2,5-dimethyl-2,5-di(t-butylperoxy)hex-3-yne; peroxyesters such as t-butyl perbenzoate and di-t-butyl-diperoxy phthalate, diacyl peroxides such as benzoyl peroxide and lauroyl peroxide; peroxyketals such as n-butyl-4,4-bis(t-butylperoxy)valerate and 1,1-di-t-butylperoxy-3,3,5-trimethylcyclohexane; and azo compounds such as azoisobutyronitrile.

The reaction conditions under which a graft copolymer of the invention is prepared typically involve heating at about 150° C. to about 250° C. The reactants typically have a residence time of about 1 to about 20 min. It is therefore difficult to select a single initiator with a decomposition rate such that initiating radicals will be present in a substantial concentration for a prolonged period of time when a relatively low concentration of initiator is used. It is therefore preferred to use a mixture of at least two initiators as an initiator system. Proper selection of the components of the initiator system overcomes the above-discussed difficulty with single initiators, and allows control and optimization of the physical properties of the product graft copolymer. Generally it is preferred that each initiator in an initiator system have a rate of decomposition substantially different from those of the other initiators in the initiator system. For example, in a process with a residence time of about 5-10 minutes at a temperature of about 200° C., an initiator system wherein one initiator has a half-life of about 30 seconds and the other initiator has a half-life of about 2 minutes has been found to be suitable. Preferred initiator systems include mixtures comprising from about 40% to about 60% by weight of 2,5-dimethyl-2,5-di(t-butylperoxy)hexane, (such as that commercially available as LUPERSOL TM 101 from Pennwalt Corporation) and from about 60% to about 40% by weight of an initiator such as 2,5-dimethyl-2,5-di(t-butylperoxy)hex-3-yne, (such as that commercially available as LUPERSOL ™ 130 from Pennwalt Corporation), t-butylhydroperoxide, or di-t-butylperoxide. Initiator decomposition rates are temperature dependent, and other particular initiator systems and preferred concentration thereof can be selected by those skilled in the art consistent with the temperature of the reaction and the residence time of the reactants.

The total initiator concentration in a process of the invention as described below is preferably from about 0.1% to about 1%, more preferably from about 0.25% to about 0.5% based on the weight of the base polymer.

The azlactone graft copolymers of the invention can be prepared using various well known reactors such as stirred tank reactors, tubular reactors and extruders. The graft copolymers are preferably made by a process involving a wiped-surface reactor. A wiped surface reactor comprises a shell or vessel that contains at least one rotor having a wiping portion located close to the inside surface of the shell and a root portion that is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during the operation of the reactor.

Intermeshing twin screw extruders can be used as wiped surface reactors. The screws function as the rotors and the flight lands function as the wiping portion, while the screw root surface between the flight lands functions as the root surface. Clearances between the inside of the barrel wall of the extruder and the flight lands of the screws are preferably in the range of about 0.25 to 0.5 mm. Although co-rotating twin screw extruders can be used, counter-rotating twin screw extruders are preferred. The counter-rotating extruder acts as a positive displacement pump conveying the reactant stream, and it also behaves like a series of small mixing zones or continuous stirred tank reactors. The counter-rotating twin screw extruder also gives good control over melting, mixing, and reaction temperatures.

Preferably, the screws of a counter-rotating twin screw extruder are divided into segments, i.e., the extruder screws can be composed of a number of separate screw segments that fit onto a common drive shaft by means of a keyway and can be disassembled and rearranged in various orders and configurations. It is also possible to utilize screw segments having multiple (e.g., two or three) starts and various pitch, and one or more screw segments can be reversed in order to increase mixing. Residence time of the reactants, and thus the properties of the resultant product, can therefore be varied by selection of screw pitch and/or screw speed (i.e., screw rpm). Furthermore, each particular zone of a twin screw extruder can be independently heated or cooled by external heating or cooling means, allowing further control of reaction conditions.

The use of a wiped surface reactor in a process of the invention is discussed with reference to FIG. 1. The base polymer can be fed in a region of the reactor coincident with the region in which the initiator system is fed. For example, the desired base polymer, preferably in pellet form, can be wetted with a free radical initiator system and purged with an inert gas such as nitrogen, helium, argon or the like, to render the material substantially free of oxygen (i.e., oxygen, if present, is present in an amount such that it does not significantly affect the desired free radical polymerization reactions). It is preferred to carry out the reaction under anhydrous conditions to prevent hydrolysis of the azlactone. This material can be fed at a predetermined rate into feed zone 1 of the wiped surface reactor. It is preferred, however, to feed the base polymer in a region of the reactor prior to the region in which the initiator system is fed. The feed zone 1 typically comprises a feed throat, into which the base polymer can be fed into the upstream end, and into which the initiator system can be fed at the downstream end. A further alternate method of feeding the base polymer and the initiator involves the use of a 2-component feed zone consisting of a base polymer feed zone into which the base polymer is fed, followed in sequence by a separate initiator feed zone into which the initiator is fed. The extruder is preferably starve fed, i.e., all material fed into the feed zone is conveyed into initiation/melt zone 2 of the extruder, and nothing is held up in the feed zone 1. Feed rates can vary with the size of the reactor and for any given size of reactor, one skilled in the art will be able to determine suitable feed rates. As an example, when a LEISTRITZ ™ 34 mm counter-rotating twin screw extruder is used feed rates are preferably from about 0.4 Kg/h to about 9 Kg/h. The feed zone screw preferably has a high pitch (e.g., 20 mm) to accommodate base polymer pellets. The feed zone can, if desired, be operated in a temperature controlled manner, depending on the reactants, reaction conditions and the like. Generally, it is suitable to maintain the feed zone of the extruder in a temperature range from about 10° C. to about 50° C., depending on the base polymer used.

In initiation/melt zone 2, the initiator system and the base polymer are mixed and heated. When non-crosslinking base polymers are used, the temperature is preferably such that radical chain reactions are initiated. Preferred temperatures will depend on the particular base polymer and initiator system, but generally temperatures in the range between 150° C. and about 250° C. are suitable. When crosslinking base polymers are used, both the feed zone and the initiation/melt zone are preferably kept at a temperature such that the initiator does not produce initiating radicals at a significant rate. As the residence time of the materials in these zones is only a small fraction of the total residence time, this serves to minimize or prevent the crosslinking of the base polymer prior to addition of the azlactone monomer. Again preferred temperatures will depend on the particular base polymer and initiator system. Generally, however, temperatures between about 100° C. and 150° C. are preferred.

In monomer addition zone 3, a nitrogen-purged 2-alkenyl azlactone monomer is added, usually by means of a high pressure pump and under an inert atmosphere. The 2-alkenyl azlactone is generally fed as a liquid or as a solution in an inert solvent (e.g., decane, toluene, tetrahydrofuran or the like). Again, feed rates are variable, and when a LEISTRITZ ™ 34 mm counter-rotating twin screw extruder is used, feed rate is preferably about 4 g/h to about 180 g/h. It is preferred to maintain the monomer addition zone at a temperature of about 150° C. to about 250° C.

Grafting and other polymerization proceeds in reaction zone 4. The reaction zone is heated. The preferred temperature will depend on the particular base polymer and initiator system used. Further, the preferred temperature of the reaction zone will depend on the intended residence time in the reaction zone. Generally, temperatures in the range of 150° C. to 250° C. and residence times in the range of 1 minute to 10 minutes are suitable.

In reactions where there remains residual monomer, it is preferred to remove the residual monomer by venting This can be done in devolatilization zone 5, where a vacuum (e.g., about 10 kPa absolute pressure) can be applied to a vent line. The resultant product is passed through block zone 6, which conveys the product graft copolymer for any further processing as desired, e.g., shaping in a die, extruding, quenching in a suitable quenching liquid, or pelletizing for convenience of handling and/or storage. The product graft copolymer can also be pelletized to useful dimensions for use without further processing.

In instances where it is desirable to quench the graft copolymer of the invention in a quenching liquid, any suitable quenching liquid can be used. Water is commonly used. However, quenching in water can cause some undesirable hydrolysis of the grafted azlactone moieties, thus reducing the amount of intact (i.e., unhydrolysed) surface azlactone available for binding to other reagents (discussed in detail below). Further, quenching in water can cause the graft copolymer to have a relatively high moisture content, which can cause internal azlactone hydrolysis and poor performance of the graft copolymer upon molding. Therefore, it is preferred to quench a graft copolymer of the invention in a quenching liquid that is inert to the azlactone functional group. It is also desirable for such a quenching liquid to have low volatility and a high specific heat. Suitable quenching liquids can be easily selected by those skilled in the art. Particularly preferred quenching liquids include fluorocarbons.

A graft copolymer of the invention has myriad applications. For example, when an adhesive tape is adhered to a sample of a polypropylene-based graft copolymer of the invention, the tape adheres more tenaciously than the same tape adhered to a polypropylene surface. Also, when a graft copolymer of the invention is heated to the melt state and coated onto a metal surface (e.g., aluminum foil, chrome plating), the copolymer bonds well to the metal surface. Such properties suggest applications such as thermoplastic adhesives and tie layers for barrier films.

Through the azlactone moieties, a graft copolymer of the invention can irreversibly bind reagents with nucleophilic functional groups. Proteins such as antibodies and antigens can be bound. A graft copolymer of the invention can be prepared, for example, in the form of an article such as a microtiter well or a test tube or in the form of beads or a film. To bind a protein to the surface of the article, the article can be contacted, e.g., incubated, with a protein, e.g., a serum or other solution containing a protein. The protein can be, for example, an antibody such as anti-human IgE, or a protein such as Protein A. The protein can also, if desired, contain a trace level of labeled (e.g., radiolabeled or fluorescence-labeled) protein to allow assay of the protein. An article with a protein bound thereto can then be further incubated, for example, with a relatively concentrated second protein solution such as bovine serum albumin or a solution of other known nucleophilic blocking agents such as ethanolamine, to react with and block any remaining azlactone moieties on the surface of the article and to displace adsorbed initial protein from the surface of the article.

An article treated as described above can be treated (e.g., incubated) with a protein denaturing agent such as sodium dodecylsulfate (SDS) to remove adsorbed protein from the surface. Analysis of the resulting article shows that significantly more protein is retained by a graft copolymer of the invention than by base polymer.

The increased irreversible binding of proteins such as antibodies by graft copolymers of the invention suggests utility in applications where protein immobilization is desirable, e.g., diagnostic applications in which proteins are immobilized, including microtiter well assay devices, bead suspensions, and the like. Cells bind poorly to hydrophilic and hydrophobic base polymers. It is known, however, that a proteinaceous layer will promote binding of cells. This invention allows one to attach proteins such as albumins, collagens, basement membrane fractions, etc., or specific proteins such as fibronectin, laminin, monoclonal antibodies, or adhesion proteins, etc., all of which can promote binding of cells to a polymer surface.

Other mono-, bi-, or poly-functional nucleophilic reagents can be bound to the graft copolymers of the invention in order to modify the surface properties (e.g., reactivity, hydrophilicity/hydrophobicity, and the like) of the graft copolymers. Particularly useful are reagents with a nucleophilic functional group capable of reacting with an azlactone and a further moiety that can impart a desired reactivity or other property to the surface of the graft copolymer. For example, low molecular weight aminoalcohols (e.g., ethanolamine) can be bound, thus providing a surface having a rather dense population of reactive hydroxyl groups. Similarly, reacting a graft copolymer of the invention with an excess of a diamine will afford a surface having a high population of nucleophilic amino groups. Other relatively simple reagents with nucleophilic functional groups can be bound to a graft copolymer of the invention. Suitable reagents include acid-containing nucleophilic reagents such as amino acids, which will impart to the graft copolymer an acidic surface (e.g., mono-amino, mono-carboxylic acids such as glycine, alanine, leucine, and the like; hydroxy functional amino acids such as serine, threonine, and tyrosine, sulfur-containing amino acids such as cysteine, cystine, and methionine; amino sulfonic acids, e.g., taurine; diacids such as aspartic acid and glutamic acid); and diamino acids (e.g., lysine and hydroxylysine), which will impart a zwitterionic surface. In the case of a relatively hydrophilic graft copolymer such as an azlactone-grafted ethylene/vinyl acetate, an aliphatic hydrocarbon group, an aromatic hydrocarbon group, or a combination thereof can be bound via the use of the corresponding amine, alcohol, or thiol (e.g., octylamine, hexadecanol, undecylamine, phenol, aniline, benzylthiol, phenethylamine, and the like) in order to decrease hydrophilicity. Fluoroaliphatic groups can be bound via the use of the corresponding fluoroaliphatic alcohols, amines, and thiols such as those disclosed in U.S. Pat. Nos. 2,666,797 (Husted), 2,691,043 (Husted), 3,398,182 (Guenther et al.), and 4,606,737 (Stern et al.) (the disclosures of each of which are incorporated herein by reference) in order to impart to the graft copolymer the repellent properties of the fluoroaliphatic group. Furthermore, nucleophilic surfactant molecules can be bound in order to impart a relatively hydophilic surface to the generally hydrophobic surface of a graft copolymer of the invention. Suitable nucleophilic surfactants include non-ionic surfactants such as polyoxyethylenes (i.e., ethoxylates), for example alcohol ethoxylates, alkylphenol ethoxylates, anhydrosorbitol esters, ethoxylated anhydrosorbitol esters, ethoxylated caster oils, glycol mono esters of fatty acids, and the like; and cationic surfactants such as aliphatic di- and polyamines, amine-functional polyoxyethylenes, alkylamine ethoxylates, hydroxy-functional 2-alkyl-2-imidazolines, and the like.

The binding of a nucleophilic reagent to a graft copolymer of the invention can be carried out by contacting the azlactone graft copolymer with the nucleophilic reagent at a temperature and for a time sufficient to cause the reagent to bind to the grafted azlactone moieties. The reaction of nucleophiles with azlactones are described by Rasmussen et al. in *Encyclopedia of Polymer Science and Engineering*, Volume 11, page 558 et. seq., H. F. Marks, Ed., Wiley, 1988 (incorporated herein by reference). A wide range of conditions is suitable depending on the nature of the nucleophilic reagent (e.g., its solubility and its nucleophilcity). For example, under certain conditions the use of a catalyst will promote the irreversible binding of less reactive nucleophilies such as alcohols. Particularly suitable catalysts include the bicyclic amidines discussed in U.S. Pat. No. 4,874,822 (Rasmussen et al.) While it is not practical to enumerate particular conditions suitable for each and every nucleophile, such conditions can be easily selected by those skilled in the art. Generally, however, room temperature exposure of a graft copolymer surface to a solution of the nucleophile in an appropriate solvent will be suitable to bind the nucleophile to the surface. A nucleophilic reagent can be irreversibly bound to a graft copolymer of the invention not only at the surface but also throughout. Binding throughout can be achieved by dissolving the nucleophile and the graft copolymer in a common solvent and allowing them to react, or by a process wherein the nucleophile reacts with the azlactone moieties under polymer melt conditions.

The amount of azlactone on the surface of a graft copolymer of the invention (i.e., the surface azlactone density) can be measured by conventional means such as x-ray photoelectron spectroscopy, Fourier transform infrared spectrophotometry, attenuated total reflectance infrared spectrophotometry, and the like. Furthermore, this surface azlactone density can be adjusted by the judicious selection of the base polymer and a surface against which the copolymer is formed (e.g., as during molding or melting against a hot plate). The effect of the particular base polymer and the forming surface on surface azlactone density is largely empirical. Generally, however, surface azlactone density is lower when the graft copolymer is formed against a non-polar surface such as a polytetrafluoroethylene surface (e.g., TEFLON TM, DuPont) than when it is formed against a more polar surface such as a polyimide (e.g., KAPTON TM, DuPont) or chrome. As between polyiimide and chrome, graft copolymers comprising some base polymers (e.g., ethylene/vinyl acetate copolymer, polypropylene) generally exhibit higher azlactone density when formed against polyiimide while those comprising other base polymers (e.g., polyethylene, polystyrene) generally exhibit higher azlactone density when formed against chrome.

The relative amount of a nucleophilic reagent that will bind irreversibly to the surface of an article made from a graft copolymer of the invention is affected by the azlactone surface density. Generally, in the case of a nucleophilic reagent with a relatively low molecular weight (e.g., less than about 1000), a higher azlactone surface density will allow more of the nucleophilic reagent to bind irreversibly. However, in the case of proteins a higher azlactone surface density will allow less protein to bind irreversibly, presumably because the higher azlactone density results in fewer hydrophobic interactions between the protein and the graft copolymer, which in turn will allow less irreversible binding to occur.

As described above, the properties of the surface of a graft copolymer of the invention can be tailored to specific needs by reacting with a selected nucleophilic reagent. Also as described above the relative amount of azlactone available at the surface of a graft copolymer of the invention can be controlled by forming against a selected surface, e.g., by molding against a mold surface made of a particular material. A mold surface having several distinct regions, each region having an independently selected surface composition, can be used to fashion an article with regionally controlled azlactone surface density. A nucleophilic reagent can then be bound to such a surface, thus affording a surface with regionally controlled surface properties such as reactivity, hydrophobicity, hydrophilicity, and the like. Regionally controlled surface properties can also be achieved by means such as selective masking to direct selected nucleophilic reagents to selected areas of an article. An article with such a surface can find use for example in a dipstick type of diagnostic device designed to perform several different tests on a biological sample simultaneously.

A further use of the azlactone graft copolymer of the invention involves blend compatibilizing. An immiscible polymer blend can be blended with an amount of a graft copolymer of the invention effective to increase the tensile strength of the immiscible blend, thereby providing a compatibilized blend with increased tensile strength. An effective amount of graft copolymer will vary with the particular immiscible polymer blend that is being compatibilized. It is therefore not practical to enumerate particular minimum amounts that constitute effective amounts for the purposes of compatibilizing any and all immiscible polymer blends. Particular effective amounts can be easily determined by those skilled in the art. Generally, however, it is preferred to use about 1 to about 10 percent by weight, more preferably about 2 to about 5 percent by weight, of a graft copolymer of the invention based on the total weight of the compatibilized blend. It is also preferred that the polymer that constitutes the base polymer of the graft copolymer is also one component of the immiscible blend. Immiscible blends that can be compatibilized include polystyrene/polybutylene blends, polystryene/polyethylene blends, polypropylene/polyethylene blends and polypropylene/polymethylmethacrylate blends. Particular immiscible blends that can be compatibilized include those comprising about 80 percent to about 95 percent by weight polypropylene and about 5 percent to about 20 percent by weight polymethyl methacrylate based on the total weight of the immiscible blend. Such blends are preferably compatibilized by a graft copolymer of this invention wherein polypropylene is the base polymer. Compatibilized blends of the invention can be prepared by conventional mixing methods well known to those skilled in the art.

A graft copolymer of the invention can also be blended with the base polymer from which it was made. Such blending can serve to improve the physical properties of the graft copolymer (e.g., impact strength, viscosity) while allowing the blend to retain the desirable reactivity associated with the azlactone moieties. The graft copolymer is present in such a blend in an amount effective to impart to the blend the reactivity of the azlactone moieties. The amount of graft copolymer that constitutes an effective amount in such a blend will depend in part on the amount of azlactone in the graft copolymer and in part on the intended use. Also, the above-described forming method can be used to control the azlactone surface density. Therefore, the amount of graft copolymer that constitutes an effective amount also depends on the nature of the surface against which the blend is formed. As a result, it is not practical to enumerate particular amounts that will constitute effective amounts for any and all blends. However, since very small amounts of azlactone can give rise to desirable reactivity, small amounts of graft copolymer can serve to impart desirable reactivity to a blend, and an effective amount can be easily determined by those skilled in the art. In particular preferred embodiments, a base polymer/graft copolymer blend comprises at least about 1 percent, more preferable at least about 10 percent, and most preferably at least about 30 percent, by weight of a graft copolymer of the invention based on the weight of the base polymer.

In the following non-limiting examples all parts and percentages are by weight unless otherwise specified, all solutions are aqueous unless otherwise specified, and all temperatures are in degrees Celsius unless otherwise specified.

EXAMPLES

Examples 1-9

These examples describe the graft copolymerization of a 2-alkenyl azlactone monomer onto polypropylene, using a twin-screw extruder in counter-rotating mode.

Polypropylene resin base polymer (DYPRO TM 8771 pellets, melt index: 9, commercially available from Fina Co., Houston, Tex.) was mixed in a 5-gallon shaker with 0.25% by weight of 90% liquid 2,5-dimethyl-2,5-di(t-butylperoxy)hexane (LUPERSOL TM 101, Pennwalt Corporation, Buffalo, N.Y.) and 0.25% by weight of one of the following: (a) 90-95% liquid 2,5-dimethyl-2,5-di(t-butylperoxy)hex- 3-yne (LUPERSOL TM 130, Pennwalt); (b) 90% liquid 5-butyl hydroperoxide (TBHP 90 TM, Pennwalt); (c) 98.5% liquid di-t-butyl peroxide (Pennwalt).

This base polymer/initiator mixture was then purged with nitrogen for 30 minutes. The resin in the feed hopper and in the feed zone of the extruder was kept under nitrogen purge and the base polymer/initiator mixture was fed with an augured feed means into the feed zone of a 34 mm counter-rotating LEISTRITZ (LEISTRITZ TM model LSM 30.34GG, Nuremburg, West Germany) twin-screw extruder (length to diameter (L/D) =35:1) configured as described below with reference to FIG. 2.

Figure 2:
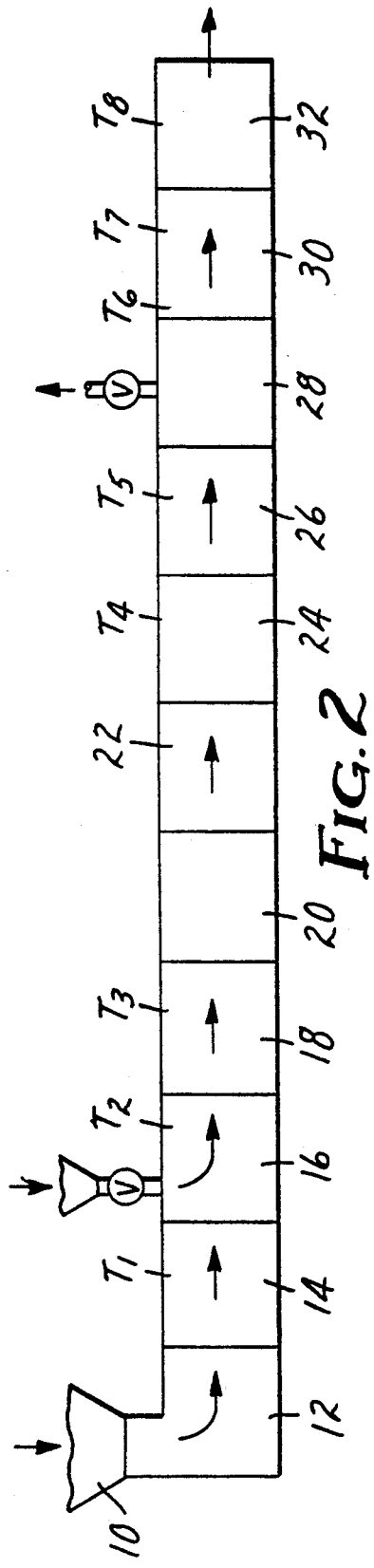
FIG. 2 is a flow diagram of a counter-rotating twin screw extruder useful in the process of this invention.

FIG. 2 shows a twin-screw extruder with a feed hopper 10, feed zone 12, and a heated barrel that comprises an initiation/melt zone comprising barrel section 14; a reaction zone comprising a monomer feed zone (barrel section 16) and barrel sections 18, 20, 22, 24, and 26; a devolatilization zone comprising barrel section 28; and a block zone comprising barrel sections 30 and 32. Each barrel section is 120 mm long, and the extruder has a total length of 1200 mm.

Transducer ports (e.g., T4 represents transducer number 4 located in barrel section 24) are located at 30 mm, and/or 90 mm into each heated barrel section. Thermocouple ports are located at 60 mm into each heated barrel section. Melt temperatures of 180° C., 200° C., and 220° C. were used with each initiator system. Polymer/initiator flow rate was kept at around 40-50 g/min. Monomeric vinyl azlactone (2-ethenyl-4,4-dimethyl-2-oxazolin-5-one, VDM, SNPE Inc., Princeton, N.J.) was purged with nitrogen and added to a nitrogen-purged RUSKA TM positive displacement pump, and added in heated barrel section 16, 270 mm from the start of the screws, at a rate of 2 mL/min. In heated barrel section 28 residual monomer was removed by vacuum. The product graft copolymers were conveyed from the block zone (barrel sections 30 and 32), which was maintained at 180° C., into a water bath and fed into a pelletizer to afford generally cylindrical beads of 3 to 4 mm in length and a diameter of about 1 mm. Reaction conditions are summarized in TABLE 1, wherein L101 designates LUPERSOL TM 101, L130 designates LUPERSOL TM 130, TBHP designates t-butyl hydroperoxide, and DTBP designates di-t-butyl peroxide.

TABLE 1

| Example | Melt Temp. (°C.) | Initiator Mixture | Base Polymer Flow Rate (g/min) |
|---|---|---|---|
| 1 | 180 | L101/L130 | 48.3 |
| 2 | 200 | L101/L130 | 60.3 |
| 3 | 220 | L101/L130 | 32.5 |
| 4 | 180 | L101/TBHP | 47.4 |
| 5 | 200 | L101/TBHP | 42.3 |
| 6 | 220 | L101/TBHP | 31.4 |
| 7 | 180 | L101/DTBP | 43.6 |
| 8 | 200 | L101/DTBP | 34.4 |
| 9 | 220 | L101/DTBP | 33.0 |

Grafting of the VDM to the polypropylene was confirmed by two methods. In the first method, samples in TABLE 1 were extracted with boiling acetone in a conventional extraction apparatus until a stable weight loss was reached in order to remove unreacted monomer. The polymer was analyzed by infrared spectroscopy before and after extraction. Grafting of VDM to polypropylene was confirmed by the presence of strong absorption bands at 1827 cm$^{-1}$ (azlactone ring), 1718 cm$^{-1}$ (hydrolyzed ring to acid), and 1653 cm$^{-1}$ (amide).

The second method used to confirm grafting of the vinyl azlactone to the base polymer involved elemental nitrogen analysis using the well known Kjeldahl method. The graft copolymer of Example 1 was found to be 0.14% N. This value correlates with the theoretical value of 0.18% N and indicates that 78% of the monomer reacted during the grafting process, and the graft copolymer is about 3.3% by weight grafted 2-alkenyl azlactone.

Samples of the graft copolymers with thickness of about 0.13 mm were made by pressing (at a pressure of about 41.4 kPa for 30 seconds using a WABASH heated press, Wabash, Ind.) about 10 g of the graft copolymers between teflon coated aluminum plates at about 200° C. The pressed samples were quenched from the molten state to the solid state in a room temperature water bath. 180° Peel adhesion tests were run on these samples and on an ungrafted polypropylene resin base polymer control sample prepared the same way, using an acrylate-based pressure-sensitive adhesive tape with a 180° peel adhesion to glass of 110 g/cm. The results are shown in TABLE 2 wherein each number represents the average of five independent determinations.

180° Peel Adhesion Test

A 2.5 cm wide, 20.3 cm long strip of pressuresensitive adhesive tape is adhered to a 10.1 cm wide, 15.2 cm long sheet of a test substrate (a pressed sample of a graft copolymer of the invention) with a free end of the tape extending beyond the end of the test substrate. The tape/substrate sample is rolled twice with a 1.35 kg hard rubber roller to ensure contact between the adhesive and the test substrate. The sample is aged at room temperature for 24 hours. The free end of the tape is removed from the test substrate at a rate of 15.2 cm/minute using a Slip/Peel Tester, (available from Instrumentors, Inc. Strongsville, Ohio).

TABLE 2

| Example | Peel Force (g/cm) |
|---------|-------------------|
| Control | 165 |
| 1 | 355 |
| 2 | 435 |
| 3 | 405 |
| 4 | 250 |
| 5 | 460 |
| 6 | 435 |
| 7 | 375 |
| 8 | 500 |
| 9 | 500 |

Table 2 indicates increased surface adhesion in all samples when compared to the polypropylene control. The graft copolymers of Examples 2, 3, 5, 6, 8 and 9 exhibited about a 3-fold increase in adhesion relative to the control and the adhesive transferred entirely from the tape to the substrate.

The viscosities of the great copolymer of Example 2 and the polypropylene base polymer were determined at various shear rates as set froth in Table 3 at melt temperatures of 190° C. and 220° C. The results are set forth in Table 3.

TABLE 3

| | Viscosity (PaSec) | | | |
|---|---|---|---|---|
| Shear Rate (1/sec.) | Polypropylene (190° C.) | Example 2 (190° C.) | Polypropylene (220° C.) | Example 2 (220° C.) |
| 150 | 198.5 | 109.0 | — | — |
| 400 | 114.0 | 71.5 | — | — |
| 700 | 84.0 | 53.0 | 82.0 | 17.5 |
| 1700 | 58.0 | 40.0 | 50.5 | 11.5 |
| 3400 | 39.0 | 24.0 | 34.0 | 8.5 |
| 6800 | 30.0 | 16.0 | 25.0 | 6.5 |
| 17000 | — | — | 16.0 | 4.0 |
| 34000 | — | — | 10.5 | 3.0 |

Graft copolymers of the invention are seen to exhibit an improvement in flow characteristics, which results in easier processing relative to the base polymer.

A 0.13 mm thick film of the graft copolymer of Example 1 was prepared as described above. The film was then independently heat sealed to samples of ethylene-propylene diene monomer rubber (EPDM rubber, Exxon Chemical, Houston, Tex.) and SANTOPRENE TM thermoplastic rubber film (Monsanto, St. Louis, Mo.). The heat-sealing was done at a temperature of about 210° C., a pressure of about 620 kPa (90 psi) and a dwell time of about 45 seconds using a SENTINEL TM Heat-Sealer (Packaging Industries, Hyannis, Mass.) with a 0.10 mm thick polyester film as a liner. The resulting seals between the graft copolymer film and both the EPDM rubber and the SANTOPRENE TM thermoplastic rubber could not be broken by hand. A control polypropylene film subjected to the same heat-sealing conditions afforded no seal to either the EPDM rubber or the SANTOPRENE TM thermoplastic rubber. This shows the usefulness of a graft copolymer of the invention as a high temperature thermoplastic adhesive.

Examples 10–13

Polystyrene resin base polymer (STYRON TM 685-DW, Dow Chemical Co., Midland, Mich.) was mixed with 0.5 wt% LUPERSOL TM 101 for 30 minutes. This mixture was purged under nitrogen for 30 minutes and then extruded at a melt temperature of 210° through the twin-screw extruder described in Example 1. Polymer flow rate was maintained at 40 g/min. The monomeric 2-alkenyl azlactone (VDM or IDM) was introduced in the second barrel section of the extruder at 2 mL/min. The calculated percent azlactone grafted onto the polystyrene are shown in TABLE 4, wherein PS designates polystyrene.

TABLE 4

| Grafted Polystyrene Azlactone Copolymers | | |
|---|---|---|
| Example | Graft Copolymer | Wt. % Azlactone |
| 10 | PS/VDM | 2.8 |
| 11 | PS/VDM | 2.8 |
| 12 | PS/IDM | 0.5 |
| 13 | PS/IDM | 0.4 |

The data in TABLE 4 suggests that VDM is more reactive in the process of the invention, since at equal concentrations, VDM incorporation into the resultant graft copolymer was about 5 times that of IDM.

Example 14

Polybutylene resin base polymer (SHELL TM 0200, Chemical Co., Houston, Tex.) was premixed with 0.5 wt% LUPERSOL TM 101 for 30 minutes. This base polymer/initiator mixture was then purged under gaseous nitrogen for 30 minutes and then extruded using the general method of Example 1. The resin in the hopper and in the feed zone of the extruder was kept under nitrogen purge. The barrel sections were heated at 170° C. Polymer/initiator flow rate was kept at around 40 g/min. IDM was added at a rate of 2 mL/min. The product graft copolymers were collected for characterization. Analysis showed that 0.32% IDM had been grafted onto the base polymer (i.e., 6.4% of the IDM present had been grafted).

Examples 15 and 16

Polybutylene resin base polymer (SHELL TM 0200) was premixed with 0.5 wt% LUPERSOL TM 101 for 30 minutes. This base polymer/initiator mixture was purged under gaseous nitrogen for 30 minutes and then extruded following the general method of Example 1. The barrel sections were heated at a temperature of 170° (Example 15) and in another run (Example 16) at a temperature of 190°. The resin in the feed hopper and in the feed zone of the extruder was kept under nitrogen purge. The polymer/initiator flow rate was kept at about 40 g/min and VDM was added at a rate of 2 mL/min. The product graft copolymers were collected for characterization and analysis. In Example 15, (170° C.) 28% of the VDM was grafted onto the polybutylene and the graft copolymer comprised 1.4% grafted VDM by weight. In Example 16 (190° C.) 48% of the VDM was grafted onto the polybutylene, and the graft copolymer comprised 2.4% grafted VDM by weight.

Pressed samples were made as described in Examples 1–9 by pressing about 10 grams of the samples of Examples 15 and 16 and ungrafted polybutylene resin base polymer (Control) between teflon coated aluminum plates at 200° C. to a thickness of 0.13 mm. The pressed samples were quenched in a room temperature water bath. Peel adhesion tests as described in Examples 1–9 were run. The results are shown in TABLE 5.

TABLE 5

| Example | Peel Force (g/cm) |
| --- | --- |
| Control | 145 (±7) |
| 15 | 165 (±8) |
| 16 | 150 (±7) |

Results in TABLE 5 indicate that Example 15 exhibits significantly increased adhesion when tested against the polybutylene control. While the material of Example 16 also shows increased adhesion, the increase is within the margin of error in the method.

Examples 17–43 and Comparative Examples a–i

Polypropylene/2-alkenyl azlactone graft copolymers were prepared as described in Examples 1–9, except that in Examples 17–20 and Comparative Examples a–h only one initiator, LUPERSOL ™ 101 (L101), was used in the amount set forth in TABLE 6, in Examples 21–31 and Comparative Example i, only one initiator, LUPERSOL ™ 130 (L130), was used in the amount set forth in /TABLE 6, and in Examples 32–43 a 1:1 mixture of initiators LUPERSOL ™ 101 and LUPERSOL ™ 130 was used in the amount set forth in TABLE 6. Screw speed was 100 rpm, and monomer flow was 2 mL/min. % VDM grafted was determined using a Perkin-Elmer Model 240C Elemental Analyzer to determine %N. Peel adhesion was determined on selected samples and polypropylene resin base polymer (Control) as in Examples 1–9 using an Instron 1122 peel adhesion tester. Processing conditions, i.e., melt temperature and total flow, mole percent VDM reacted, weight percent VDM, and peel adhesion test values are shown in TABLE 6.

TABLE 6 shows that the graft copolymers of the invention exhibit improved adhesion properties relative to the polypropylene control sample. Further, Comparative Examples a–h of TABLE 6 show that LUPERSOL ™ 101, with a relatively high rate of decomposition, is not an effective initiator at higher temperatures and lower concentrations, as incorporation of the azlactone moiety is low in such cases. Likewise, Comparative Example i indicates that LUPERSOL ™ 130 is not an effective initiator at higher temperature and lower concentration. Further, Examples 32–43 demonstrate that an initiator system comprising two initiators is effective at high temperatures and at lower concentration of initiator.

TABLE 6

| Example | Initiator (Conc. wt %) | Melt Temp (°C.) | Total Flow (g/min) | Mol % VDM Reacted | Wt. % VDM | Peel Force g/cm |
| --- | --- | --- | --- | --- | --- | --- |
| a | L101 (0.1) | 180 | 40.1 | 0 | — | — |
| b | L101 (0.1) | 200 | 41.8 | 0 | — | — |
| c | L101 (0.1) | 220 | 35.2 | 0 | — | — |
| 17 | L101 (0.25) | 180 | 37.4 | 26 | 1.4 | — |
| d | L101 (0.25) | 200 | 39.4 | 0 | — | — |
| e | L101 (0.25) | 220 | 29.8 | 0 | — | — |
| 18 | L101 (0.5) | 180 | 31.2 | 19 | 1.2 | — |
| f | L101 (0.5) | 200 | 36.2 | 0 | — | — |
| g | L101 (0.5) | 220 | 29.5 | 0 | — | — |
| 19 | L101 (1.0) | 180 | 31.1 | 53 | 3.4 | 300 |
| 20 | L101 (1.0) | 200 | 30.7 | 51 | 3.3 | 290 |
| h | L101 (1.0) | 220 | 31.5 | 0 | — | — |
| 21 | L130 (0.1) | 180 | 35.4 | 100 | 5.6 | 285 |
| 22 | L130 (0.1) | 200 | 33.5 | 100 | 6.0 | 230 |
| i | L130 (0.1) | 220 | 34.5 | 0 | — | — |
| 23 | L130 (0.25) | 180 | 36.8 | 100 | 5.4 | 240 |
| 24 | L130 (0.25) | 200 | 32.6 | 89 | 5.5 | 240 |
| 25 | L130 (0.25) | 220 | 32.3 | 68 | 4.2 | 240 |
| 26 | L130 (0.5) | 180 | 26.1 | 70 | 5.4 | — |
| 27 | L130 (0.5) | 200 | 28.2 | 51 | 3.5 | 230 |
| 28 | L130 (0.5) | 220 | 24.7 | 38 | 3.1 | — |
| 29 | L130 (1.0) | 180 | 36.8 | 93 | 5.1 | 240 |
| 30 | L130 (1.0) | 200 | 36.8 | 78 | 4.2 | 280 |
| 31 | L130 (1.0) | 220 | 40.0 | 80 | 4.0 | — |
| 32 | 0.1 | 180 | 36.5 | 53 | 2.9 | 235 |
| 33 | 0.1 | 200 | 36.4 | 53 | 2.9 | 220 |
| 34 | 0.1 | 220 | 27.3 | 37 | 2.7 | — |
| 35 | 0.25 | 180 | 32 | 37 | 2.3 | 225 |
| 36 | 0.25 | 200 | 32 | 17 | 1.1 | 235 |
| 37 | 0.25 | 220 | 32 | <16 | <1.1 | 250 |
| 38 | 0.50 | 180 | 30 | 75 | 5.0 | 295 |
| 39 | 0.50 | 200 | 40.3 | 82 | 4.1 | 310 |
| 40 | 0.50 | 220 | 85.0 | 46 | 1.1 | — |
| 41 | 1.0 | 180 | 37.3 | 82 | 4.4 | 310 |
| 42 | 1.0 | 200 | 33.4 | 63 | 3.8 | 230 |
| 43 | 1.0 | 220 | 28.9 | 41 | 2.8 | — |
| Control | — | 180 | 40 | — | — | 210 |

Molecular weights of various select samples and a polypropylene resin base polymer control were determined using a Jordi mixed bed column in a Waters 150°

C. high temperature chromatograph. The results are set forth in TABLE 7.

TABLE 7

| Example | Initiator (wt. %) | MW |
| --- | --- | --- |
| d | L-101 (0.25) | 66,800 |
| 23 | L-130 (0.25) | 57,600 |
| 35 | L-101 (0.125)/L-130(0.125) | 71,100 |
| 18 | L-101 (0.50) | 42,600 |
| 26 | L-130 (0.50) | 38,500 |
| 38 | L-101 (0.25)/L-130(0.25) | 44,800 |
| 19 | L-101 (1.0) | 33,800 |
| 29 | L-130 (1.0) | 18,500 |
| 41 | L-101 (0.50)/L-130(0.50) | 38,000 |
| Control |  | 120,000 |

The data in TABLE 7 show that the use of two initiators in combination gives better retention of molecular weight (i.e. less net degradation) than one initiator at the same total initiator concentration.

Example 44

Figure 3:
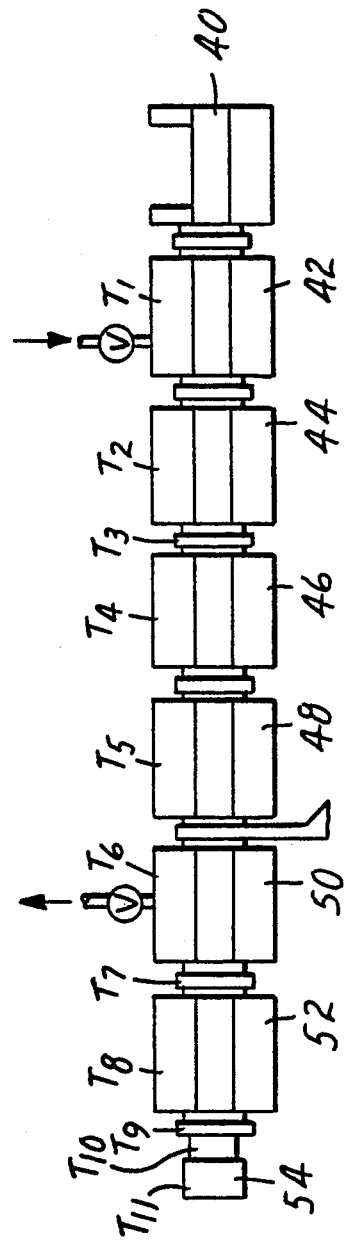
FIG. 3 is a flow diagram of another counter-rotating twin screw extruder useful in the process of this invention.

This example describes the scale-up graft polymerization of VDM monomer onto polypropylene using a 67 mm twin screw extruder in the counter rotating mode. The process is described with reference to FIG. 3. FIG. 3 shows a twin-screw extruder much like that shown in FIG. 2 and described in Examples 1-9. Particularly, the extruder comprises a feed zone 40, a heated barrel that comprises barrel section 42 comprising both an initiation/melt zone and a monomer addition zone, barrel sections 44, 46, and 48 comprising a reaction zone, barrel section 50 comprising a devolatilization zone and barrel section 52 comprising a block zone, and a die 54. Transducer ports (e.g., $T_1$ represents transducer number 1 in barrel section 42) are located as shown in FIG. 3, and thermocouple ports are located in each heated component of the extruder. The extruder was a LEISTRITZ TM ASFG7GG.

The temperature profile of the extruder was as follows:

| Transducer | T(°C.) |
| --- | --- |
| 1 | 185 |
| 2 | 180 |
| 3 | 179 |
| 4 | 178 |
| 5 | 190 |
| 6 | 190 |
| 7 | 180 |
| 8 | 180 |
| 9 | 180 |
| 10 | 200 |
| 11 | 218 |

The feed zone was ambient temperature, and screw speed was 50 rpm.

The base polymer feed hopper and the extruder feed throat were purged with nitrogen. The base polymer (DYPRO TM 8771), was fed at a rate of 18.1 kg/h using a K-tron 6300 feeder. The initiator (a 1:1 mixture by weight of LUPERSOL TM 130 and LUPERSOL TM 101) was purged with nitrogen and fed at a rate of 2 mL/min using a single piston RUSKA TM digital positive displacement pump at the downstream end of the feed throat, a distance of 270 mm from the start of the screws. The 2-alkenyl azlactone monomer (VDM) was purged with nitrogen and fed at a rate of 463 mL/h through a high pressure injection valve using a dual piston RUSKA TM positive displacement pump, at a distance of 610 mm from the start of the screws. Vacuum venting of unreacted 2-alkenyl azlactone was performed in heated barrel section 50. The product graft copolymer was extruded through a 10-strand die that fed into a water bath and a Conair pelletizer.

Analysis indicated that about 86% of the VDM added was grafted onto the base polymer.

Example 45

Using the apparatus and general method of Example 44, a polystyrene/VDM graft copolymer was prepared. The base polymer (STYRON TM 685-2G-W, Dow Chemical Co.) was fed at a rate of 22.7 kg/h and the initiator system was added at 2 mL/min to the downstream end of the extruder feed throat. The 2-alkenyl azlactone monomer (VDM) was fed at a rate of 463 mL/h at the end of barrel zone 1. The temperature profile of the apparatus was as follows:

| Transducer | T(°C.) |
| --- | --- |
| 1 | 190 |
| 2 | 212 |
| 3 | 214 |
| 4 | 214 |
| 5 | 210 |
| 6 | 210 |
| 7 | 212 |
| 8 | 210 |
| 9 | 213 |
| 10 | 222 |
| 11 | 220 |

The feed zone was water-cooled.

Analysis showed that about 98% of the VDM was grafted onto the base polymer.

Example 46

This example describes the binding of radiolabeled anti-human IgE to VDM-grafted polypropylene using the graft copolymer from Example 1 prepared in bead form with a diameter of about 1 mm and a length of about 3 to 4 mm.

Anti-human IgE was purified by Mono Q anion exchange chromatography (pH 8.0, Tris buffer), and radioiodinated with Na$^{125}$I using Iodo-Beads (Pierce Chemical Co., Rockford, Ill.).

Purified, iodinated anti-IgE prepared above was added to unlabeled anti-IgE to obtain a solution with a concentration of 3.1 µg/mL and a specific radioactivity of 5 to 25×10$^3$ counts per minute per microgram (cpm/µg). The labeled antibody solution (150 µL of the 3.1 µg/mL solution) was incubated with the VDM-grafted polypropylene beads for 2 hours at ambient temperature.

The treated beads were then incubated with bovine serum albumin (2.5 mg/mL, Sigma Chemical Co., St. Louis, Mo.) for 60 minutes to react any remaining azlactone moieties and displace adsorbed anti-IgE. The sample was then aspirated and the beads were analyzed for $^{125}$I using a Packard Auto-gamma scintillation spectrometer (Packard Instruments, United Technologies, Downers Grove, Ill., Model 5230). The degree of irreversible binding of the antibodies to the polymer beads was determined by incubation of the beads with a 0.1% protein-denaturing detergent, sodium dodecylsulfate (SDS), at 37° for 4 hours, which incubation serves to remove adsorbed (as opposed to irreversibly bound) proteins from the beads. Polypropylene resin base polymer beads (Control) prepared in the same manner were also tested. Three replicates of each experiment were performed. The results are shown in TABLE 8, wherein SDS Resistance refers to the percent of radioactivity remaining after SDS incubation.

TABLE 8

| Example | Antibody Bound (ng/cm$^2$) | SDS Resistance (%) |
|---|---|---|
| Control | 36 | 6.4 |
| 46 | 83 | 24 |

Grafting of VDM more than doubled the amount of immobilized antibody and increased the percentage of irreversibly bound antibody almost four-fold relative to the polypropylene control.

Examples 47–50

In Examples 47–50, beads prepared from the azlactone-grafted polystyrene copolymers of Examples 10 and 11 (polystyrene/VDM) and Examples 12 and 13 (polystyrene/IDM), respectively, were treated and tested following the procedure described in Example 46. Polystyrene resin base polymer beads (Control) prepared in the same manner were also treated and tested. The results are summarized in TABLE 9, wherein SDS Resistance refers to the percent of the radioactivity remaining after incubation with sodium dodecylsulfate as described in Example 46.

TABLE 9

| Example | Antibody Bound (ng/cm$^2$) | SDS Resistance (%) |
|---|---|---|
| Control | 131 | 42 |
| 47 | 81 | 69 |
| 48 | 69 | 77 |
| 49 | 88 | 50 |
| 50 | 95 | 55 |

The amount of antibody bound prior to SDS treatment decreased in the graft copolymers of the invention relative to the polystyrene control. However, SDS resistance of the treated graft copolymers increased by 10 to 30% relative to the polystyrene control. This can be explained as follows: Polystyrene binds proteins by hydrophobic interactions between the polystyrene surface and the protein. These interactions tend to eventually denature the protein on the polystyrene surface rendering the bound protein less useful. Decreasing the hydrophobic nature of the polystyrene surface by addition of a relatively polar, grafted azlactone moiety tends to reduce the absolute amounts of protein bound. Additionally, if the decreased hydrophobicity is caused by a moiety capable of irreversibly coupling to protein, then the percent SDS resistance will tend to increase.

Examples 51–54

In Examples 51 and 53, the VDM-grafted polystyrene polymer of Example 11 was molded into microtiter 12-well strips. In Examples 52 and 54, the IDM-grafted polystyrene polymer of Example 13 was molded into microtiter 12-well strips. Each well had a radius of 7 mm, depth of 12 mm, and a capacity of about 0.3 mL. Radiolabeled antibody was bound to the wells at the pH indicated in TABLE 10, as described in Example 46. A fluorescent ELISA was performed using the unlabeled wells.

Antibody binding and precision studies and immunoassays, using 48 replicates in each example, were performed with wells treated with 3.1 µg/mL antibody solutions prepared as described in Example 46. SDS resistance studies were performed using 16 of the radiolabeled precision study replicates. Eight were with 200 µL of 1.0% SDS for 4 hours at 37° C. and eight with an equal volume of phosphate buffered saline (pH 7.4).

Results are shown in TABLE 10, wherein CV refers to the coefficient of variation, and FSU refers to fluorescent signal units.

TABLE 10

| Example (type) | Antibody Protein Bound (ng) | Binding CV (%) | SDS Resistance (%) | Immunoassay Activity | |
|---|---|---|---|---|---|
| | | | | FSU | CV (%) |
| Control* | 74 | 2.7 | 42.6 | 1015 | 6.7 |
| 51 (PS/VDM)* | 70 | 7.7 | 58.6 | 910 | 10.0 |
| 52 (PS/IDM)* | 76 | 4.0 | 47.4 | 1208 | 18.1 |
| Control** | 67 | 2.8 | 39.8 | 1002 | 8.3 |
| 53 (PS/VDM)** | 51 | 9.0 | 66.3 | 772 | 13.9 |
| 54 (PS/IDM)** | 76 | 13.7 | 49.4 | 1086 | 19.4 |

*pH 7.5;
**pH 8.5

TABLE 10 shows that VDM consistently yields the greater degree of irreversible binding of antibody (i.e., the VDM grafted copolymer has a greater SDS resistance than the IDM grafted copolymer). The immunoassay activity results show that at each pH IDM yields a higher fluorescent signal. However, there is also an increase in the coefficient of variation. Thus, based on precision and the degree of irreversible binding, the VDM-grafted polystyrene appears superior to both the IDM material and the control.

Examples 55–56

In Examples 55 and 56, microtiter wells treated with radiolabeled anti-IgE as described in Examples 51 and 52 were incubated for 13 days at ambient temperature with phosphate-buffered saline (PBS), pH 7.4, or with human serum diluted with an equal part of PBS. The liquid was aspirated from the wells and radioactivity of the well was determined. The wells were then incubated for 4 hours with 1% SDS to remove adsorbed protein, rinsed, and radioactivity again determined. Polystyrene resin base polymer microtiter wells prepared in the same manner (Control) were also tested for radioactivity. Data are given in TABLE 11.

TABLE 11

| Example | SDS-Resistant Protein Binding (cpm) | | |
|---|---|---|---|
| | Day 0 | Day 13/PBS | Day 13/Human Serum |
| Control | 1632 | 1950 | 239 |
| 55 (PS/VDM) | 1752 | 2117 | 1712 |
| 56 (PS/IDM) | 1587 | 1820 | 534 |

Data in TABLE 11 show that the VDM-grafted wells prevented removal of the protein to a greater extent than the IDM-grafted wells. Although it appears that there is increased antibody in all wells after 13 days in PBS this is probably an artifact of the continuing increase in the amount of hydrophobic bonding of protein to a hydrophobic surface as the protein continues to denature onto the surface.

In the serum-incubated wells, serum protein competes for the available surface, replacing practically all but the irreversibly bound protein. In the VDM-grafted copolymer wells there is about a seven-fold increase in retention of protein relative to control wells (97.7% vs 14.6% of their Day 0 values).

Examples 57-58

In Examples 57 and 58, the heights and diameters of beads of the graft copolymers described in Examples 44 and 45, respectively, were measured and their surface areas were calculated. Sufficient beads (4-7) to give a total of 0.5 cm² to 1.0 cm² of surface area were placed in 12×75 mm polystyrene test tubes.

Protein A (Genzyme Corp., Boston, Mass.) was radioiodinated and diluted to give a final specific radioactivity of 10,000 cpm/µg of protein dissolved in 10 mM sodium phosphate, 150 mM sodium chloride buffer, pH 7.5, with a final protein concentration of 250 µg/mL.

The Protein A solution (100 µL) was added to each tube of beads and allowed to react for 2 hours with vortex mixing at 15 minute intervals. The reaction was terminated by removal of the protein solution and addition of 200 µL of 0.5 M butylamine in the phosphate buffer described above. This reaction was mixed at 15 minute intervals, and the butylamine solution was removed after 60 minutes. An additional 200 µL of butylamine solution was added to quench further. After 30 minutes the beads were washed three times with 500 µL of the phosphate buffer, transferred to clean test tubes, and monitored for residual radioactivity in a Packard Auto-gamma Scintillation Spectrometer Model 5230.

After radioactivity determination, the tubes of beads were incubated with either PBS or human serum. After two weeks incubation at ambient temperature, the solution was removed from each set of beads, and they were incubated with 1% SDS (sodium dodecylsulfate) at 37° C. After 4 hours each tube was rinsed with 3×500 µL of SDS solution and the radioactivity of the beads was determined. Polypropylene and polystyrene resin base beads (Controls) were treated and tested for radioactivity using the procedures used for Examples 57-58. The results are shown in TABLE 12.

TABLE 12

| Example | Bound Protein (ng/cm²) | PBS-SDS Resistance (%) | Serum-SDS Resistance (%) |
|---|---|---|---|
| 57 (PP/VDM) | 132.0 | 98 | 83 |
| PP control | 8.9 | 84 | 12 |
| 58 (PS/VDM) | 263.0 | 90 | 64 |
| PS control | 18.0 | 70 | 36 |

TABLE 12 shows that graft copolymers of the invention are more effective than control base polymers at immobilizing Protein A.

Examples 59-60

This example demonstrates the binding of anti-human IgE to microtiter reaction wells and the biological activity of such reaction wells in a fluorescent ELISA test.

VDM-grafted polypropylene microtiter wells were prepared from the copolymer from Example 44. Affinity-purified anti-human IgE was radioiodinated and diluted for binding studies to a concentration of 2,000 to 10,000 cpm/µg. Unlabeled antibody was used for the immunochemical studies. The wells were treated overnight with 10 mM sodium phosphate, 150 mM sodium chloride, pH 7.4 (Example 59), or 100 mM sodium carbonate, pH 9.4 (Example 60) with a 5 µg/mL antibody solution followed by a 45 minute incubation with 2.5 mg/mL bovine serum albumin The amount of antibody bound was determined by isotopic decay. SDS resistance was determined by redetermination of the amount of antibody bound after incubation of the well with 1% SDS for 4 hours at 37° C. Polypropylene resin base polymer microtiter wells (Controls) were prepared, treated, and tested using the procedures used for Examples 59 and 60. Immunochemical activity was determined as described in Examples 51-54. Diluted hyperallergenic serum was used to determine the mean fluorescent signal units (FSU) and coefficient of variation (CV) values. The results are set forth in TABLE 13.

TABLE 13

| | Binding Activity | | Immunochemical Activity | |
|---|---|---|---|---|
| Example (pH) | Protein Bound | SDS Resistance | Mean FSU | CV |
| Control (7.4) | 196 ng | 6% | 747 | 7.2% |
| 59 (PP/VDM) (7.4) | 202 ng | 88% | 840 | 6.1% |
| Control (9.4) | 153 ng | 6% | 535 | 7.1% |
| 60 (PP/VDM) (9.4) | 148 ng | 91% | 480 | 7.1% |

The data in TABLE 13 show that the VDM/polypropylene graft copolymer of the invention affords an increase in the amount of irreversibly bound antibody without negatively affecting the coefficient of variation of the immunochemical activity of the treated well. The incorporation of the azlactone functionality makes the surface more hydrophilic so that protein does not denature onto the surface, while tightly binding the protein so that it does not wash off during assay.

Examples 61 and 62

These examples demonstrate the binding of anti-human IgE to microtiter reaction wells prepared from VDM-grafted polystyrene materials of Example 45, and the biological activity of such wells.

Following the procedures used in Examples 59 and 60, microtiter wells prepared from the VDM-grafted polystyrene were prepared, treated at the pH indicated in TABLE 14, and tested. Polystyrene resin base polymer microtiter wells (Controls) were prepared, treated and tested using the same procedures. The results are set forth in TABLE 14.

TABLE 14

| | Binding Activity | | Immunochemical Activity | |
|---|---|---|---|---|
| Example (pH) | Protein Bound | SDS Resistance | Mean FSU | CV |
| Control (7.4) | 215 ng | 23% | 594 | 7.1% |
| 61 (PS/VDM) (7.4) | 207 ng | 45% | 548 | 4.0% |
| Control (9.4) | 211 ng | 37% | 736 | 7.9% |
| 62 (PS/VDM) (9.4) | 192 ng | 79% | 768 | 4.2% |

As seen in TABLE 14, the greatest change observed when using a graft copolymer of the invention relative to the control base polymer is in the amount of tightly bound protein, which doubles at each pH. An additional advantage seen is a reduction in the variation (CV) of the fluorescent signal associated with the immunochemical activity.

Examples 63-66

These examples demonstrate the resistance of azlactone on the surface of VDM-grafted polystyrene wells to degradation by temperature and water vapor.

Untreated wells of material from Example 45 were stored under the particular storage conditions set forth below for 4 and 11 days, then treated with either radioiodinated antibody (for binding studies) or unlabeled antibody at pH of 9.4 using the general method of Examples 59-60 The four storage conditions were: room temperature (RT), desiccated (Example 63); RT, ambient humidity (varying from day to day but generally high) (Example 64); 37° C., ambient humidity (stored in a tissue culture incubator without elevated humidity) (Example 65); and 37° C., high humidity (stored in a tissue culture incubator with controlled atmosphere of 5% $CO_2$ and 98% relative humidity) (Example 66).

TABLE 15

| | BINDING STUDIES | | | |
|---|---|---|---|---|
| | Protein Bound (ng) | | SDS Resistance (%) | |
| Example | Day 4 | Day 11 | Day 4 | Day 11 |
| 63 | 219 | 200 | 80 | 80 |
| 64 | 218 | 198 | 82 | 82 |
| 65 | 217 | 202 | 81 | 80 |
| 66 | 228 | 196 | 74 | 75 |
| IMMUNOCHEMICAL STUDIES | | | | |
| | FSU (CV) | | | |
| Example | Day 4 | | Day 11 | |
| 63 | 437 (8.0) | | 374 (9.0) | |
| 64 | 419 (5.0) | | 415 (2.8) | |
| 65 | 507 (7.4) | | 519 (3.8) | |
| 66 | 461 (6.1) | | 380 (5.6) | |

No loss of protein-binding capacity of the wells caused by 11 days of storage of the wells at elevated temperature and humidity was observed. However, there is a small but significant reduction (from 80% to 74%) in the SDS resistant binding. Since there is no change at 37° C., ambient humidity, this reduction in tight binding appears to be more closely associated with moisture than with temperature, consistent with water opening the azlactone ring before the protein treatment step.

Paired t-test analysis of the immunochemical results indicate that at the 0.05 level there is no significant difference betweeen day 4 and day 11 for any of the treatments, nor is there a difference between RT, desiccated and 37° C., elevated humidity conditions. Thus, manufactured wells appear to be stable under normal laboratory or manufacturing conditions.

Examples 67-71

These examples demonstrate the preparation of graft polymers of ethylene/vinyl acetate and VDM (i.e., EVA/VDM).

VDM was grafted to ethylene/vinylacetate copolymer (EVA, ELVAX TM 410, 18% vinyl acetate, DuPont) using a 34 mm LEISTRITZ TM extruder. The initiator system used was a 50:50 mixture of LUPERSOL TM 101 and LUPERSOL TM 130. The initiators were added directly into the nitrogen-purged feed throat of the extruder, and the monomer VDM was added at the end of zone 2. The extrudate was cooled in a bath of mixed saturated $C_7$ fluorocarbons and dry ice to prevent hydrolysis of the azlactone ring, chopped into cylindrical pellets about 3 mm long, and stored under desiccating conditions. TABLE 16 lists the run conditions for each of five graft copolymers. Zones 1 and 2 of the extruder were kept at 150° C. to prevent initiation of the crosslinking reaction in the EVA. Temperatures in the middle zones were kept near the optimal initiation temperature of the initiators. Temperatures in zones 9 and 10 were reduced to near the melting temperature of EVA to allow the polymer to readily solidify upon extrusion. Comparative experiments at higher temperatures (180° C.) in zones 9 and 10 formed crosslinked material that was too viscous to be extruded.

TABLE 16

| | Example | | | | |
|---|---|---|---|---|---|
| Condition | 67 | 68 | 69 | 70 | 71 |
| Flow Rate (g/min) | 43.6 | 43.8 | 46.0 | 40.1 | 41.2 |
| Reaction Temp (°C.) | 160 | 160 | 160 | 160 | 180 |
| RPM | 87 | 87 | 89 | 90 | 88 |
| VDM (g/min) | 1.0 | 3.33 | 3.33 | 1.0 | 2.0 |
| VDM (wt %) | 2.3 | 7.6 | 7.2 | 2.5 | 4.9 |
| Init (g/min) | 0.11 | 0.11 | 0.33 | 0.33 | 0.22 |
| Init (wt %) | 0.25 | 0.25 | 0.72 | 0.83 | 0.53 |
| Temperatures (°C.) | | | | | |
| Zone | | | | | |
| 1 | 153 | 153 | 153 | 153 | 154 |
| 2 | 147 | 145 | 146 | 146 | 143 |
| 3 | 154 | 155 | 155 | 169 | 168 |
| 4 | 167 | 163 | 163 | 167 | 187 |
| 5 | 158 | 156 | 155 | 167 | 181 |
| 6 | 156 | 153 | 156 | 156 | 178 |
| 7 | 162 | 161 | 159 | 162 | 183 |
| 8 | 142 | 138 | 138 | 140 | 170 |
| 9 | 79 | 82 | 81 | 79 | 80 |
| Block (10) | 83 | 83 | 82 | 82 | 81 |

Molecular weight analyzes was done by gel permeation chromatography on each of these examples. Results are shown in Table 17. The increase in molecular weight observed for each example indicates that crosslinking has occurred (Mn, the number average molecular weight, has increased for each new graft copolymer). P, the ratio of the weight to number average molecular weights, is a measure of the polydispersity of the sample. The increase in P emphasizes the increase in the size of the polymer molecules.

TABLE 17. Molecular weights of EVA/VDM graft copolymers.

| Example | Mw (× $10^{-4}$) | Mn (× $10^{-3}$) | P (Mw/Mn) | Viscosity (poise) |
|---|---|---|---|---|
| Control | 1.51 | 4.70 | 3.21 | 372 |
| 67 | 1.46 | 5.63 | 2.59 | — |
| 68 | 1.92 | 5.74 | 3.35 | 458 |
| 69 | 2.44 | 6.75 | 3.62 | 782 |
| 70 | 2.28 | 6.51 | 3.51 | — |
| 71 | 2.41 | 6.06 | 3.97 | 825 |

Examples 69-71 show a greater increase in molecular weight than Examples 67 and 68, presumably because of the higher initiator concentration used in their preparation.

Elemental analysis was performed in order to determine the amount of incorporated nitrogen. Azlactone incorporation is determined by multiplying the %N by 10, the mass ratio of azlactone to nitrogen in monomeric VDM. Results are shown in TABLE 18 below. Efficiency is calculated as the percent of the available azlactone that was incorporated into polymer.

TABLE 18

| Elemental analysis of EVA/VDM graft copolymers. | | | | |
|---|---|---|---|---|
| Example | % VDM Added | % N | % VDM Grafted | Efficiency |
| Control | 0.0 | <0.1 | — | — |
| 67 | 2.3 | <0.1 | <1.0 | <43% |
| 68 | 7.6 | <0.1 | <1.0 | <10 |
| 69 | 7.2 | 0.3 | 3.0 | 42 |
| 70 | 2.5 | <0.1 | <1.0 | <40 |

TABLE 18-continued

| Elemental analysis of EVA/VDM graft copolymers. | | | | |
|---|---|---|---|---|
| Example | % VDM Added | % N | % VDM Grafted | Efficiency |
| 71 | 4.9 | 0.2 | 2.0 | 41 |

Several % N values are below 0.1%. This does not indicate that there was no azlactone incorporated. Rather, it indicates only that the value falls below the sensitivity limit of elemental analysis. Despite the low level of azlactone incorporation, some of these graft copolymers are shown below to demonstrate the significant effects of the presence of azlactone, particularly irreversible binding of protein.

The data of TABLES 17 and 18 taken together indicate that the graft copolymerization conditions that result in the greatest amount of incorporated azlactone (i.e., those of Example 69) do not result in the greatest increase in viscosity or molecular weight ratio P.

Examples 72-81

The examples below demonstrate the binding of human immunoglobulin G (IgG) to EVA/VDM.

The pellets from each of Examples 67-71 were stored desiccated until used. For each protein binding experiment sufficient pellets (cylinders about 5 mm long×2 mm diameter) were used to give a total surface area of approximately 1 cm$^2$. Radiolabeled ($^{125}$I) human IgG was prepared as described in Example 46 above. Pellets were incubated with IgG solution (2.5 mg/mL in buffer) with shaking at ambient temperature. In experiments designated below as "low salt" the buffer was 25 mM sodium phosphate buffer, 150 mM NaCl, ph 7.5, and the specific radioactivity was 2790 cpm/μg. In experiments designated below as "high salt" 1.5 M Na$_2$SO$_4$ was substituted for the sodium chloride solution and specific radioactivity was 2760 cpm/μg.

After 2 h the protein solution was removed, unreacted azlactone was reacted with 3.0 M aqueous ethanolamine, pH 9.0 for 1 h, and the pellets were rinsed three times with the low salt buffer solution. After the amount of bound radioactivity was determined using a Packard gamma-counter the pellets were incubated with 1.0% aqueous sodium dodecylsulfate (SDS) at 37° C. for 4 h, and the residual radioactivity was redetermined. Results are shown in TABLE 19.

TABLE 19

The binding of human IgG to EVA/VDM graft copolymers under high and low salt conditions.

| Example | Polymer Sample | Total Bound Protein (μg/cm$^2$) | SDS Resistance | Irreversibly Bound Protein (μg/cm$^2$) |
|---|---|---|---|---|
| | "High Salt" | | | |
| — | Control EVA | 3.31 | 16.6% | 0.56 |
| 72 | Example 67 | 4.57 | 80.0 | 3.66 |
| 73 | Example 68 | 4.32 | 85.0 | 3.67 |
| 74 | Example 69 | 4.35 | 86.8 | 3.77 |
| 75 | Example 70 | 5.77 | 70.7 | 4.15 |
| 76 | Example 71 | 3.95 | 63.4 | 2.56 |
| | "Low Salt" | | | |
| — | Control EVA | 1.73 | 23.4 | 0.46 |
| 77 | Example 67 | 1.93 | 75.9 | 1.46 |
| 78 | Example 68 | 2.56 | 75.3 | 1.91 |
| 79 | Example 69 | 2.51 | 77.2 | 1.91 |
| 80 | Example 70 | 1.88 | 71.1 | 1.34 |
| 81 | Example 71 | 1.97 | 61.8 | 1.22 |

The results in TABLE 19 indicate: All VDM grafts bind considerably more protein than the base polymer, even those with relatively low VDM content; the values for total binding, SDS resistance, and irreversible binding parallel the amount of VDM incorporated into the graft copolymer suggesting that, at least up to the limit of the highest VDM content obtained (3.0%), protein binding is approximately proportional to VDM content; the high salt condition increases the total amount of binding and the amount of irreversible binding but not the percent of SDS resistance.

Examples 82-91

Experiments similar to those described in Examples 72-81 above were performed on graft and base polymers using radiolabeled Protein A according to the methods described in Examples 72-81 above for human IgG. The concentration of Protein A was 2.5 mg/mL and the specific radioactivities were 2660 and 2580 cpm/μg, respectively, for the low salt and high salt conditions. Results from these experiments are shown in TABLE 20.

TABLE 20

The binding of Protein A to EVA/VDM graft copolymers under high and low salt conditions.

| Example | Polymer Sample | Total Bound Protein (μg/cm$^2$) | SDS Resistance | Irreversibly Bound Protein (μg/cm$^2$) |
|---|---|---|---|---|
| | "High Salt" | | | |
| — | Control EVA | 2.55 | 48.5 | 1.23 |
| 82 | Example 67 | 2.37 | 55.7 | 1.32 |
| 83 | Example 68 | 3.00 | 55.7 | 1.68 |
| 84 | Example 69 | 2.94 | 57.2 | 1.67 |
| 85 | Example 70 | 2.45 | 53.7 | 1.32 |
| 86 | Example 71 | 2.45 | 52.4 | 1.27 |
| | "Low Salt" | | | |
| — | Control EVA | 1.92 | 36.0 | 0.68 |
| 87 | Example 67 | 1.86 | 51.0 | 0.93 |
| 88 | Example 68 | 1.99 | 56.4 | 1.11 |
| 89 | Example 69 | 2.04 | 63.1 | 1.29 |
| 90 | Example 70 | 1.59 | 58.7 | 0.94 |
| 91 | Example 71 | 1.70 | 58.6 | 0.99 |

The conclusions from the human IgG studies described above generally hold for Protein A binding. Differences in the magnitudes of the results with different proteins presumably result from the differences between proteins (such as their relative hydrophilicity). The general observation remains that grafting of VDM to the EVA base polymer results in greater total binding and an increase in net tight binding.

Examples 92-94

These examples demonstrate the preparation of graft copolymers of polyethylene and VDM (i.e., PE/VDM).

VDM was grafted to linear low density polyethylene (DOWLEX TM 2517, Dow Chemical, Midland, MI) using the conditions listed in TABLE 21 below according to the procedures described above in Examples 67-71. Comparative experiments with PE above 200° C. caused excessive crosslinking and made the product polymer unextrudable, as observed above in the case of EVA.

TABLE 21

| | Example | | |
|---|---|---|---|
| | 92 | 93 | 94 |
| Condition | | | |
| Flow Rate (g/min) | 46.7 | 43.6 | 45.4 |
| Reaction Temp (°C.) | 180 | 180 | 200 |
| RPM | 98 | 98 | 100 |

TABLE 21-continued

| | Example | | |
|---|---|---|---|
| | 92 | 93 | 94 |
| VDM (g/min) | 1.0 | 2.0 | 1.0 |
| VDM (wt %) | 2.1 | 4.5 | 2.2 |
| Init (g/min) | 0.061 | 0.123 | 0.061 |
| Init (wt %) | 0.13 | 0.28 | 0.13 |
| Temperatures (°C.) | | | |
| Zone 1 | 151 | 150 | 151 |
| 2 | 148 | 147 | 145 |
| 3 | 170 | 162 | 173 |
| 4 | 188 | 186 | 204 |
| 5 | 184 | 174 | 202 |
| 6 | 180 | 177 | 196 |
| 7 | 187 | 184 | 204 |
| 8 | 214 | 219 | 231 |
| 9 | 188 | 187 | 203 |
| Block (10) | 182 | 181 | 202 |

Molecular weight analysis was performed. The results in TABLE 22 below indicate that the grafting process results in higher Mw, Mn, and P values.

TABLE 22

Molecular weights of PE/VDM graft copolymers.

| Example | Mw ($\times 10^{-4}$) | Mn ($\times 10^{-3}$) | P (Mw/Mn) |
|---|---|---|---|
| Control | 2.95 | 8.64 | 3.42 |
| 92 | 3.60 | 9.88 | 3.65 |
| 93 | 4.78 | 12.70 | 4.38 |
| 94 | 4.48 | 10.20 | 4.38 |

Elemental analysis was performed. The results in Table 23 below indicate that both higher initial VDM concentration and higher temperature lead to greater incorporation of VDM in to the copolymer.

TABLE 23

Elemental analysis of PE/VDM graft copolymers.

| Example | % VDM Added | % N | % VDM Grafted | Efficiency |
|---|---|---|---|---|
| Control PE | 0.0 | <0.1 | — | — |
| 92 | 2.1 | <0.1 | <1.0 | <48.0 |
| 93 | 4.5 | 0.3 | 3.0 | 67.0 |
| 94 | 2.2 | 0.2 | 2.0 | 91.0 |

Examples 95-106

These examples demonstrate the binding of protein to PE/VDM.

Experiments were conducted using base polyethylene (PE) and VDM graft copolymers according to the procedures used in Examples 72-91. Specific radioactivities were 2760 (high salt) and 2750 cpm/μg for IgG and 2640 (high salt) and 2700 cpm/μg for Protein A. The results are shown in TABLES 24 and 25 below.

TABLE 24

Binding of IgG to PE/VDM graft copolymers under high salt and low salt conditions.

| Example | Polymer Sample | Total Bound Protein (μg/cm$^2$) | SDS Resistance (%) | Irreversibly Bound Protein (μg/cm$^2$) |
|---|---|---|---|---|
| | "High Salt" | | | |
| — | Control PE | 2.88 | 11.1 | 0.32 |
| 95 | Example 72 | 2.90 | 56.1 | 1.63 |
| 96 | Example 73 | 2.92 | 67.1 | 1.96 |
| 97 | Example 74 | 2.28 | 57.2 | 1.30 |
| | "Low Salt" | | | |
| — | Control PE | 2.93 | 12.4 | 0.36 |
| 98 | Example 72 | 1.92 | 44.0 | 0.84 |
| 99 | Example 73 | 1.99 | 57.8 | 1.15 |

TABLE 24-continued

Binding of IgG to PE/VDM graft copolymers under high salt and low salt conditions.

| Example | Polymer Sample | Total Bound Protein (μg/cm$^2$) | SDS Resistance (%) | Irreversibly Bound Protein (μg/cm$^2$) |
|---|---|---|---|---|
| 100 | Example 74 | 1.96 | 51.2 | 1.00 |

TABLE 25

Binding of Protein A to PE/VDM graft copolymer under high salt and low salt conditions.

| Example | Polymer Sample | Total Bound Protein (μg/cm$^2$) | SDS Resistance (%) | Irreversibly Bound Protein (μg/cm$^2$) |
|---|---|---|---|---|
| | "High Salt" | | | |
| — | Control PE | 0.83 | 31.1% | 0.26 |
| 101 | Example 72 | 0.90 | 41.5 | 0.37 |
| 102 | Example 73 | 0.94 | 48.1 | 0.45 |
| 103 | Example 74 | 0.93 | 43.2 | 0.40 |
| | "Low Salt" | | | |
| — | Control PE | 0.55 | 28.7 | 0.16 |
| 104 | Example 72 | 0.68 | 42.9 | 0.29 |
| 105 | Example 73 | 0.61 | 51.1 | 0.31 |
| 106 | Example 74 | 0.67 | 37.7 | 0.25 |

The data in TABLES 24 and 25 show that both proteins bind to FE/VDM, in the same general way that they bind to EVA/VDM making allowances for all overall reduction in binding with PE compared with EVA. In all cases the graft polymers gave greater irreversible binding than their corresponding controls. The data in TABLES 24 and 25 also show that the general trends with Protein A are similar to those observed with human IgG: VDM grafting enhances the amount of SDS resistance and the amount of covalently bound protein. Additionally, there is a slight but consistent increase in the total bound Protein A compared to IgG. The results also show that Protein A has a higher basal level of SDS resistance than IgG with PE as the base polymer. This is consistent with results wherein EVA is the base polymer.

Examples 107-118

The results below show a comparison of the VDM graft copolymer with its base polymer for protein binding.

Each graft copolymer was compared with its base polymer for the binding of both Protein A and human IgG using the protein binding procedures and solutions described above in connection with Examples 72-91. The graft-to-control ratio of amount of protein bound is listed in TABLE 26 below for both total protein binding and tight (SDS-resistant) binding at two salt concentrations. Examples 108, 111, 112, 117, and 118 below present data original to TABLE 26, while Examples 107, 109, 110, and 113-116 present compilations of data from previous TABLES.

TABLE 26

Ratio of Binding (Graft:Control)

| | | High Salt | | Low Salt | |
| Example | Polymers | Total | Irreversible | Total | Irreversible |
|---|---|---|---|---|---|
| | Immunoglobulin G | | | | |
| 107 | Example 74: EVA Control | 1.31 | 6.73 | | |
| 108 | Example 69: EVA Control | | | 1.45 | 4.15 |
| 109 | Example 94: | 1.01 | 6.12 | | |

TABLE 26-continued

| | | Ratio of Binding (Graft:Control) | | | |
|---|---|---|---|---|---|
| | | High Salt | | Low Salt | |
| Example | Polymers | Total | Irre-versible | Total | Irre-versible |
| 110 | Example 99: PE Control | | | 0.68 | 3.19 |
| 111 | Example 44: PP Control | 1.21 | 2.95 | 1.12 | 1.85 |
| 112 | Example 45: PS Control | 0.48 | 0.59 | 0.76 | 1.28 |
| | | Protein A | | | |
| 113 | Example 84: EVA Control | 1.15 | 1.36 | | |
| 114 | Example 89: EVA Control | | | 1.06 | 1.90 |
| 115 | Example 102 PE Control | 1.13 | 1.73 | | |
| 116 | Example 105: PE Control | | | 1.11 | 1.94 |
| 117 | Example 44: PP Control | 1.50 | 2.53 | 0.98 | 2.46 |
| 118 | Example 45: PS Control | 0.66 | 0.77 | 0.52 | 0.60 |

For three of the polymers (EVA, PE, and PP) there is consistently greater irreversible binding of protein to the graft than to the base polymer. These results suggest that VDM graft copolymers can have utility where it is important to immobilize protein.

PS is an exception to the general trend. Only one of the four sets of conditions (low salt with IgG) shows increased binding. As described in Examples 61-62 above, although binding of an antibody is not necessarily increased in microtiter immunoassay wells prepared from grafted PS, the precision of the immunoassy is increased.

Examples 119-122

These examples show the binding of protein to films prepared from graft copolymers of the invention.

Films of graft copolymers of the invention were prepared by melting beads in a hot press at 225° C. between chrome-coated photographic mounting plates as described in Examples 123-126 below. The films were kept dry until use Discs of 8 mm diameter were prepared using a standard paper punch and used in binding experiments using procedures identical to those described above. Specific radioactivities were 4800 (high salt) and 4420 cpm/$\mu$g for IgG; for Protein A the values were 5280 and 5040 (high salt) and 4775 and 5280 cpm/$\mu$g. Results are shown in TABLE 27 below.

TABLE 27

| | | The binding of protein to thin films of VDM-graft copolymers. | | | | | |
|---|---|---|---|---|---|---|---|
| | | Low Salt | | | High Salt | | |
| Example | Polymer Sample | Binding Density ($\mu$g/cm$^2$) | SDS Resistance (%) | Irreversible Binding Density ($\mu$g/cm$^2$) | Binding Density ($\mu$g/cm$^2$) | SDS Resistance (%) | Irreversible Binding Density ($\mu$g/cm$^2$) |
| | | | | Immunoglobulin G | | | |
| — | EVA | 3.50 | 8 | 0.29 | 1.58 | 12 | 0.18 |
| 119 | EVA/VDM | 2.46 | 72 | 1.76 | 0.90 | 43 | 0.39 |
| — | PE | 3.22 | 21 | 0.68 | 1.56 | 25 | 0.39 |
| 120 | PE/VDM | 2.55 | 57 | 1.46 | 0.70 | 44 | 0.31 |
| | | | | Protein A | | | |
| — | EVA | 0.69 | 12 | 0.08 | 0.66 | 12 | 0.08 |
| 121 | EVA/VDM | 0.51 | 33 | 0.17 | 0.80 | 47 | 0.38 |
| — | PE | 0.42 | 19 | 0.08 | 0.48 | 13 | 0.06 |
| 122 | PE/VDM | 0.37 | 44 | 0.16 | 0.62 | 52 | 0.32 |

These results show that hot pressed films of these graft copolymers of the invention retain their ability to markedly increase irreversible protein binding. However, the magnitude of binding and the effect of high salt concentration are somewhat different with the pressed films than with the pellets used in Examples 46-50, 72-91, and 95-106 above.

There is a relatively lower SDS resistance in the pressed films compared with the extruded pellets. We believe that this is caused by the swelling of the films in water which allows for unbound protein to be trapped inside the film during the binding step and not washed out until the more extensive SDS treatment and its washings.

Examples 123-126

The results below demonstrate physical and chemical characterizations of films produced from azlactone graft copolymers and their base polymers.

Films of the graft copolymers and their respective base polymer controls were made by pressing about 10 g of beads between chrome-coated aluminum plates for 20 s at about 84,000 kPa using a heating press (Wabash Co., Wabash, IN). For ethylene/vinylacetate based materials the press temperature was 107° C., and for polyethylene, polypropylene, and polystyrene -based materials the press temperature was 218° C. The pressed films were cooled by one of two methods: 1) immersion in an ambient temperature water bath; 2) slow, air cooling of the film while it remained between the press plates augmented by wiping the plates with wet paper towels.

Films were prepared by pressing against a chrome plate covered with SCOTCH TM KAPTON TM Film Tape No. 5413 (3M).

ESCA results below demonstrate that nitrogen is present at the surface of the films. The atomic abundances of carbon, oxygen, and nitrogen within 6 to 10 nm of the surface of the films are shown is TABLE 28 below.

TABLE 28

| ESCA analysis of azlactone-grafted and base polymer films. | | | | |
|---|---|---|---|---|
| | Polymer | Atom Weight-Percent | | |
| Example | Sample | C | O | N |
| — | EVA Control | 76 | 16 | — |
| 123 | EVA/VDM (Example 69) | 78 | 15 | 2.7 |
| — | PE Control | 96 | 2.6 | — |
| 124 | PE/VDM (Example 93) | 91 | 4.9 | 0.7 |
| — | PP Control | 97 | 1.5 | — |
| 125 | PP/VDM (Example 44) | 85 | 8.6 | 0.9 |

TABLE 28-continued

ESCA analysis of azlactone-grafted and base polymer films.

| Example | Polymer Sample | Atom Weight-Percent | | |
|---|---|---|---|---|
| | | C | O | N |
| — | PS Control | 92 | 5.0 | — |
| 126 | PS/VDM (Example 45) | 86 | 8.6 | 0.9 |

All base polymers lack nitrogen, and each graft polymer has nitrogen at the surface. An approximation of the surface abundance of azlactone can be obtained by multiplying the % N value by 10. Thus, the approximate surface abundance of azlactone ranges from 7–27%. As a significant increase in the surface oxygen in the non-oxygen-containing polymers.

Examples 127–132

These examples demonstrate the preparation of a hydrophilic surfaces using ethanolamine to modify an azlactone-graft polymer.

Films of EVA (18% (w/w) vinylacetate content) and EVA/VDM were prepared by pressing against KAPTON TM as described above and cooled by immersion in an ambient temperature water bath. Ethanolamine (Sigma Chem. Co., St. Louis, Mo.) and $^{14}C$- radiolabeled ethanolamine-HCl (Sigma) were used to prepare a 10 mM ethanolamine solution in 25 mM sodium pyrophosphate, 25 mM sodium phosphate, pH 9.0. The specific radioactivity was $7.04 \times 10^{12}$ cpm/mol. Discs of 8 mm diameter were prepared from the films using a standard office paper punch. Discs were incubated with 150 μL of ethanolamine solution for 2 h or 16 h as indicated in 2.0 mL polypropylene microfuge tubes (Sarstedt, Princeton, N.J.). Discs were rinsed twice (5 min each) with 250 μL of 3.0 M ethanolamine in the same buffer, and the radioactivity of the discs was determined using a Packard (Downers Grove, Ill.) Tri-Carb 460CD liquid scintillation system and Ready-Solv HP (Beckman Instruments, Fullerton, Calif.) scintillation fluor. Results are shown in TABLE 29.

TABLE 29

Binding of ethanolamine to EVA/VDM.

| | | Ethanolamine Bound (nmol/cm$^2$) | |
|---|---|---|---|
| Example | Polymer Sample | 2 h | 16 h |
| — | EVA Control | 0.14 | 0.34 |
| 127 | EVA/VDM (Example 69) | 1.15 | |
| 128 | EVA/VDM (Example 69) | | 2.72 |

The results demonstrate that a considerable amount of ethanolamine binds irreversibly to the surface of the graft copolymer of Example 69. Additionally, more is bound in 16 h than in 2 h.

The above procedures were repeated with some variations with other graft copolymers. Films were prepared as described above, all incubations were for 16 h, and the specific radioactivities were $3.51 \times 10^{12}$ cpm/mol for the EVA and PE experiments and $7.15 \times 10^{12}$ cpm/mol for the PS and PP experiments. Films for EVA and PE and their grafts were prepared against a KAPTON TM surface, and these for PP and PS were similarly pressed against a TEFLON TM surface. Results are shown in TABLE 30 below.

TABLE 30

The binding of ethanolamine to various base polymers and their grafted VDM copolymers.

| Example | Polymer Sample | Ethanolamine Bound (nmol/cm$^2$) |
|---|---|---|
| — | EVA Control | 1.02 |
| 129 | EVA/VDM (Example 69) | 3.66 |
| — | PE Control | 0.10 |
| 130 | PE/VDM (Example 93) | 2.30 |
| — | PP Control | 0.07 |
| 131 | PP/VDM (Example 44) | 0.35 |
| — | PS Control | 0.48 |
| 132 | PS/VDM (Example 45) | 1.32 |

In all cases there was an enhancement of binding of ethanolamine to the grafted polymer compared with its base polymer. The enhancement is from about two-fold to over twenty-fold.

An enhancement of $5 \times 10^{14}$ molecules of bound ethanolamine per cm$^2$ in the film of Example 132 as compared to the PS control was calculated.

Examples 133–136

These examples demonstrate the preparation of aniline derivatives of various azlactone-grafted polymers.

Aniline (MCB, Cincinati, Ohio) and $^{14}C$-aniline (NEN-DuPont, Billerica, Mass.) were sued to prepare 10 mM aniline solutions in isopropanol (specific radioactivity = $1.13 \times 10^{11}$ cpm/mol) for reaction with KAPTON TM -pressed films and cooled by slow air cooling of the film while it remained between the press plates, augmented by wiping the plates with wet paper towels. Films were incubated with 150 μL of reagent for 16 h and tested as described above in connection with Examples 127–132. The results appear in Table 31 below.

TABLE 31

The reaction of azlactone graft copolymers with aniline.

| Example | Polymer Sample | Aniline Bound (nmol/cm$^2$) |
|---|---|---|
| — | EVA Control | 1.95 |
| 133 | EVA/VDM (Example 69) | 642 |
| — | PE Control | 1.48 |
| 134 | PE/VDM (Example 93) | 59 |
| — | PP Control | 1.63 |
| 135 | PP/VDM (Example 44) | 4.63 |
| — | PS Control | 3.03 |
| 136 | PS/VDM (Example 45) | 4.07 |

The results show that grafting of azlactone onto the base polymer enhances the amount of aniline that is bound to the polymer. The net increase in aniline binding in grafted PS was 1 nmol/cm$^2$, or $6 \times 10^{14}$ molecules/cm$^2$. It appears that more than surface reaction takes place with the EVA and EVA/VDM because the films swell in the presence of isopropanol, thus such results are not expected in other solvents. However, no swelling of either PE or PE/VDM films in isopropanol was observed. It appears that the observed 40-fold enhancement was caused by binding to surface-available azlactone. The density of azlactone functionality on the PE/VDM surface was calculated to be $60 \times 10^{14}$ molecules/cm$^2$.

Examples 137-140

These examples demonstrate the modification of azlactone-grafted copolymer surfaces with lysine.

Lysine is zwitterionic at normal physiological conditions, and, since it is a diamine, should retain its zwitterionic condition after reacting with azlactone. Such properties make it an attractive candidate as a surface modifying agent when a mixed ionic surface is desired.

Lysine solutions were prepared using lysine-HCl (Eastman, Rochester, N.Y.) and tritium-labeled ($^3$H) lysine (NEN-DuPont). Chrome-pressed films were incubated overnight as described in connection with Examples 127-132 with 1.0 mM lysine (specific radioactivity $= 1.08 \times 10^{14}$ cpm/mol) in the pH 9.0 buffer. Lysine solution (130 μL) was used and two 2 h washes with 1 mM lysine were used to block unreacted sites and remove any unreacted radiochemical. Results are shown in TABLE 32 below.

TABLE 32

The reaction of azlactone graft copolymers with lysine.

| Example | Polymer Sample | Lysine Bound (nmol/cm$^2$) |
|---|---|---|
| — | EVA Control | 3.25 |
| 137 | EVA/VDM (Example 69) | 17.48 |
| — | PE Control | 1.22 |
| 138 | PE/VDM (Example 93) | 6.23 |
| — | PP Control | 2.00 |
| 139 | PP/VDM (Example 44) | 4.18 |
| — | PS* Control | 1.03 |
| 140 | PS*/VDM (Example 45) | 3.00 |

*TEFLON ™ -pressed film

For each base polymer there was greater lysine incorporation in the azlactone graft copolymer than in the base copolymer. Water contact angles for lysine-treated PE, PP, and PS base polymers were 104°, 97°, and 95°, respectively. The values for the corresponding graft polymers were 76°, 65°, and 68°, indicating a more hydrophilic surface due to bound lysine.

Example 141

This example demonstrates the modification of azlactone-graft PS with taurine.

PS and PS/VDM film strips from KAPTON ™ pressings were incubated overnight with taurine solution (0.5 M in water, pH 4.9) and with water as a control. Films were rinsed twice with water (2h), air-dried, and placed in plastic containers until subsequent surface analysis.

Untreated PS film had a water contact angle of 84°±2°, and there was no change upon incubation with taurine. Untreated PS/VDM exhibited slightly greater hydrophobicity (90° water contact angle). Upon reaction with taurine water contact angle was reduced to 74°. These results indicate that the reaction produces a more hydrophilic surface. ESCA analysis showed that sulfur had been added to the surface of the graft copolymer by the reaction with taurine.

Example 142

This example demonstrates the modification of azlactone-grafted EVA with phenethylamine.

Strips of EVA and EVA/VDM films prepared by sing against KAPTON ™ surfaces were incubated overnight with either 0.5 M phenethylamine in a pH 9.0 buffer or in buffer alone, rinsed with buffer, and air dried.

Water contact angles were measured. The contact angle for phenethylamine-treated EVA/VDM was 9° higher than that of the similarly treated EVA (86° vs. 77°), indicating a more hydrophobic surface due to bound phenethylamine.

Example 143

This example demonstrates the modification of azlactone-grafted EVA with benzylthiol.

Strips of EVA/VDM and EVA films hot-pressed against a chrome surface were incubated with 0.1 M benzylthiol in isopropanol (or in isopropanol alone as a control) using the standard reaction conditions, rinsed extensively with isopropanol, air dried, and stored dessicated until analysis. Water contact angles were measured. There was a change from 86° to 90° in water contact angle, indicating an increase in surface hydrophobicity due to bound benzylthiol.

Example 144

This example demonstrates the modification of azlactone-grafted PE with octylamine.

Strips of TEFLON ™ -pressed film were incubated overnight in 0.5 M octylamine solutions in isopropanol (and in isopropanol along as a control), rinsed extensively, air dried, and stored dessicated until analysis.

Water contact angles were measured. The results are shown in TABLE 33.

TABLE 33

Analysis of octylamine-treated and control PE films.

| Film | Contact Angle |
|---|---|
| PE | 103° |
| PE/VDM | 94° |
| Octylamine Treated PE | 96° |
| Octylamine Treated PE/VDM (Example 144) | 111° |

The reaction of PE/VDM with octylamine increased the hydrophobicity of the surface, as shown by the contact angle increase from 96° to 111°. This compares very favorably with a decrease of 9° in contact angle upon treatment of PE base polymer with octylamine (103° for untreated vs. 94° after treatment).

Example 145

The example demonstrates the modification of azlactone-grafted PP with a surfactant.

JEFFAMINE ™ (an amine-functional polyoxyethylene surfactant with a molecular weight of 600, available from Texaco), was used to confer a hydrophilic surface on the relatively hydrophobic PP. Strips of films were incubated overnight with 0.1 M aqueous solutions of JEFFAMINE ™ or with water as a control, then subjected to the standard rinsing, drying, and storage. ESCA analyses are shown in TABLE 34.

TABLE 43

ESCA analysis of JEFFAMINE ™ -treated films.

| Film | Atom Weight Percent | |
|---|---|---|
| | C | O |
| PP | 97 | 1.4 |
| PP/VDM | 97 | — |

TABLE 43-continued

ESCA analysis of JEFFAMINE ™ -treated films.

| Film | Atom Weight Percent | |
|---|---|---|
| | C | O |
| Water Treated PP | 99 | — |
| Water Treated PP/VDM | 95 | — |
| JEFFAMINE ™ Treated PP | 96 | 3.3 |
| JEFFAMINE ™ Treated PP/VDM (Example 145) | 88 | 8.3 |

Reaction with JEFFAMINE ™ is indicated by the large increase in surface oxygen in the graft copolymer films relative to the control film as well as by the decrease in surface carbon. Also, the water contact angle of the grafted film (103±6°) decreased upon reaction with JEFFAMINE ™ (86°±3°). This was also a significant decrease relative to the contact angle of JEFFAMINE ™ -treated control PP film (95°+/−3°).

Examples 146–147

These examples demonstrate the modification of grafted FE and PP with phenol.

Films were reacted overnight at ambient temperature with 30 mL of 0.5 M phenol in 25 mM sodium pyrophosphate buffer, pH 9.0, sealed in test tubes. Films were extensively washed and dried before spectral analysis.

FT-IR spectra were obtained on a Bio-Rad FTS-40 spectrophotometer (Bio-Rad, Digilab Div., Cambridge, Mass.). The net phenol spectrum was obtained by subtracting the spectrum of the unreacted film from the phenol-reacted PS/VDM film of Example 146. The following absorptions were observed and assigned as indicated: 1594 cm$^{-1}$, phenyl ester; 1546 cm$^{-1}$; amide formed by the ring-opening reaction; 1502 cm$^{-1}$, phenyl ester. Similar bands were observed in the phenol-reacted PE/VDM film of Example 147.

Examples 148–149

These examples demonstrate the modification of grafted PP and PS with a fluorochemical alcohol.

A fluorochemical alcohol ($C_7F_{15}CH_2OH$) was reacted with graft copolymer and control films of PS pressed against KAPTON ™ and with graft copolymer and control films of PP pressed against TEFLON ™ The reaction was run overnight in aqueous solution containing as a catalyst 10 mg/mL DBU (1,8-diazabicyclo [5.4.0]undec-7-ene, Aldrich Chem. Co., Milwaukee) and 50 mg/mL of the fluorochemical alcohol. The films were rinsed with water several times then with isopropyl alcohol to remove residual fluorochemical. ESCA results (TABLE 35, wherein "FC" designates that the film has been treated with the fluorochemical alcohol) indicate that considerably more fluorine was present on the graft copolymer films than on the films of the base polymers.

TABLE 35

ESCA analysis of fluorochemical alcohol-treated films.

| Film | Atomic Weight Percent | | | |
|---|---|---|---|---|
| | C | O | N | F |
| PP Control | 93 | 1.9 | — | 3.5 |
| PP/VDM/FC (Example 148) | 86 | 3.0 | 0.8 | 9.4 |
| PS Control | 93 | 4.5 | 1.3 | — |
| PS/VDM/FC (Example 149) | 91 | 5.3 | 1.4 | 0.9 |

Examples 150–161

These examples demonstrate surface effects in films formed against various surfaces.

ESCA surface analyses are reported in TABLE 40 below as a function of the surface which the graft copolymers were formed against—KAPTON ™, TEFLON ™, or chrome.

TABLE 36

Surface analysis of azlactone graft copolymer films.

| Example | Film | Atomic Weight Percent | | |
|---|---|---|---|---|
| | | Carbon | Oxygen | Nitrogen |
| | EVA/VDM | | | |
| 150 | KAPTON ™ | 78 | 15 | 2.7 |
| 151 | TEFLON ™ | 80 | 10 | 2.5 |
| 152 | Chrome | 85 | 12 | 2.5 |
| | PE/VDM | | | |
| 153 | KAPTON ™ | 91 | 4.9 | 0.7 |
| 154 | TEFLON ™ | 86 | 2.3 | 0.6 |
| 155 | Chrome | 94 | 4.1 | 1.7 |
| | PP/VDM | | | |
| 156 | KAPTON ™ | 85 | 8.6 | 0.9 |
| 157 | TEFLON ™ | 95 | 1.9 | — |
| 158 | Chrome | 96 | 2.6 | — |
| | PS/VDM | | | |
| 159 | KAPTON ™ | 86 | 8.6 | 0.9 |
| 160 | TEFLON ™ | 91 | 3.0 | — |
| 161 | Chrome | 90 | 7.4 | 1.9 |

The amount of nitrogen on the surface varies with the polymer and the nature of the hot plate surface. However, the TEFLON ™ surface consistently yields less nitrogen on the film surface than either of the other surfaces. Variously KAPTONυ (EVA, PP) or chrome (PE, PS) yield the greatest surface nitrogen values.

The behavior of EVA is different from the other base polymers The surface nitrogen content is considerably greater than the other, more hydrophobic, polymers.

Examples 162–173

The results in TABLES 37 and 38 below demonstrate the binding of Protein A to azlactone-grafted PE and EVA films as a function of the surface against which the films were formed. The protein binding experiments were carried out according to the general methods of Examples 72–91 above.

TABLE 37

Protein A binding to EVA/VDM.

| | | High Salt | | | Low Salt | | |
|---|---|---|---|---|---|---|---|
| Example | Polymer Sample | Total Bound Protein A (μg/cm$^2$) | SDS Resistance (%) | Irreversibly Bound Protein A (μg/cm$^2$) | Total Bound Protein A (μg/cm$^2$) | SDS Resistance (%) | Irreversibly Bound Protein A (μg/cm$^2$) |
| | KAPTON ™ | | | | | | |
| — | EVA | 0.61 | 14.0 | 0.085 | 0.68 | 10.6 | 0.073 |
| 162 | EVA/VDM | 1.04 | 56.2 | 0.58 | — | — | — |
| 163 | EVA/VDM TEFLON ™ | — | — | — | 0.81 | 44.5 | 0.37 |

TABLE 37-continued

Protein A binding to EVA/VDM.

| Example | Polymer Sample | High Salt | | | Low Salt | | |
|---|---|---|---|---|---|---|---|
| | | Total Bound Protein A (μg/cm²) | SDS Resistance (%) | Irreversibly Bound Protein A (μg/cm²) | Total Bound Protein A (μg/cm²) | SDS Resistance (%) | Irreversibly Bound Protein A (μg/cm²) |
| | EVA | 1.04 | 12.1 | 0.13 | 1.19 | 8.5 | 0.10 |
| 164 | EVA/VDM | 0.96 | 56.7 | 0.54 | | | |
| 165 | EVA/VDM Chrome | — | — | — | 0.72 | 43.3 | 0.32 |
| | EVA | 0.66 | 12.0 | 0.079 | 0.69 | 12.1 | 0.082 |
| 166 | EVA/VDM | 0.80 | 47.0 | 0.38 | | | |
| 167 | EVA/VDM | — | — | — | 0.51 | 32.8 | 0.17 |

TABLE 38

Protein A binding to PE/VDM.

| Example | Polymer Sample | High Salt | | | Low Salt | | |
|---|---|---|---|---|---|---|---|
| | | Total Bound Protein A (μg/cm²) | SDS Resistance (%) | Irreversibly Bound Protein A (μg/cm²) | Total Bound Protein A (μg/cm²) | SDS Resistance (%) | Irreversibly Bound Protein A (μg/cm²) |
| | KAPTON TM PE | 0.46 | 11.5 | 0.050 | 0.41 | 15.1 | 0.062 |
| 168 | PE/VDM | 0.57 | 52.4 | 0.29 | | | |
| 169 | PE/VDM TEFLON TM | | | | 0.62 | 51.5 | 0.32 |
| | EVA | 0.53 | 10.7 | 0.057 | 0.57 | 11.2 | 0.062 |
| 170 | PE/VDM | 1.11 | 75.0 | 0.83 | | | |
| 171 | PE/VDM Chrome | | | | 0.85 | 58.2 | 0.49 |
| | PE | 0.48 | 13.3 | 0.065 | 0.42 | 18.6 | 0.078 |
| 172 | PE/VDM | 0.62 | 52.4 | 0.32 | | | |
| 173 | PE/VDM | | | | 0.37 | 44.3 | 0.16 |

The data show that Protein A binds to a greater extent to the graft copolymers than to the control base polymers, independent of the surface used to prepare the film. Also, Protein A binds to a greater extent from high sulfate solution than from physiological saline. However, there are distinct differences in the density of bound Protein A as a function of the forming surface. Overall TEFLON TM yields higher densities (although KAPTON TM is equivalent for EVA). Chrome consistently yields lower density.

Examples 174–185

These examples demonstrate the binding of IgG to azlactone-grafted EVA and PP films as a function of the surface against which the films were formed. Protein binding experiments were carried out according to the general methods of Examples 72–91.

TABLE 39

Human IgG binding to EVA/VDM.

| Example | Polymer Sample | High Salt | | | Low Salt | | |
|---|---|---|---|---|---|---|---|
| | | Total Bound IgG (μg/cm²) | SDS Resistance (%) | Irreversibly Bound IgG (μg/cm²) | Total Bound IgG (μg/cm²) | SDS Resistance (%) | Irreversibly Bound IgG (μg/cm²) |
| | KAPTON TM EVA | 1.46 | 14 | 0.20 | 3.03 | 11 | 0.33 |
| 174 | EVA/VDM | 0.82 | 72 | 0.59 | | | |
| 175 | EVA/VDM TEFLON TM | | | | 2.51 | 86 | 2.17 |
| | EVA | 1.52 | 17 | 0.26 | 3.46 | 16 | 0.56 |
| 176 | EVA/VDM | 0.92 | 74 | 0.68 | | | |
| 177 | EVA/VDM Chrome | | | | 2.59 | 82 | 2.13 |
| | EVA | 1.58 | 12 | 0.18 | 3.50 | 8 | 0.29 |
| 178 | EVA/VDM | 0.90 | 43 | 0.39 | | | |
| 179 | EVA/VDM | | | | 2.46 | 72 | 1.76 |

TABLE 40

Human IgG binding to PE/VDM.

| Example | Polymer Sample | High Salt | | | Low Salt | | |
|---|---|---|---|---|---|---|---|
| | | Total Bound IgG (μg/cm²) | SDS Resistance (%) | Irreversibly Bound IgG (μg/cm²) | Total Bound IgG (μg/cm²) | SDS Resistance (%) | Irreversibly Bound IgG (μg/cm²) |
| — | KAPTON TM PE | 1.30 | 23 | 0.29 | 3.59 | 18 | 0.66 |

TABLE 40-continued

| | | Human IgG binding to PE/VDM. | | | | | |
|---|---|---|---|---|---|---|---|
| | | High Salt | | | Low Salt | | |
| Example | Polymer Sample | Total Bound IgG (μg/cm²) | SDS Resistance (%) | Irreversibly Bound IgG (μg/cm²) | Total Bound IgG (μg/cm²) | SDS Resistance (%) | Irreversibly Bound IgG (μg/cm²) |
| 180 | PE/VDM | 0.69 | 62 | 0.43 | | | |
| 181 | PE/VDM TEFLON ™ | | | | 3.05 | 69 | 2.10 |
| | PE | 1.24 | 19 | 0.23 | 4.01 | 12 | 0.50 |
| 182 | PE/VDM | 0.85 | 69 | 0.59 | | | |
| 183 | PE/VDM Chrome | | | | 4.40 | 77 | 3.42 |
| | PE | 1.56 | 25 | 0.39 | 3.22 | 21 | 0.68 |
| 184 | PE/VDM | 0.70 | 44 | 0.31 | | | |
| 185 | PE/VDM | | | | 2.25 | 57 | 1.46 |

The data in TABLES 39 and 40 for IgG binding are similar to those seen in TABLES 37 and 38 for Protein A binding. TEFLON ™ is preferred for high density, chrome for low density. The effect of salt is the opposite of the salt effect on Protein A binding. This appears to be a protein-dependent effect. The surprising result is that TEFLON ™, a very hydrophobic material and one that generally yields the lowest surface-available azlactone, is the one that results in the greatest amount of irreversibly bound IgG.

Examples 186–210

The results in TABLES 41–43 below demonstrate binding of low molecular weight amines to films of azlactone graft copolymers and the effect of varying the surface against which the film is formed.

TABLE 41

The binding of aniline to azlactone graft copolymer films.

| | Aniline Bound (nmol/cm²) | | |
|---|---|---|---|
| Film | KAPTON ™ | TEFLON ™ | Chrome |
| EVA Control EVA/VDM | 2.0 | 2.5 | 1.5 |
| Example 186 | 642 | | |
| Example 187 | | 532 | |
| Example 188 | | | 497 |
| PE Control PE/VDM | 1.5 | 1.5 | 2.1 |
| Example 189 | 58.7 | | |
| Example 190 | | 113 | |
| Example 191 | | | 143 |
| PP Control PP/VDM | 1.6 | 3.9 | 2.5 |
| Example 192 | 4.6 | | |
| Example 193 | | 4.7 | |
| Example 194 | | | 7.5 |
| PS Control PS/VDM | 3.0 | 3.8 | |
| Example 195 | 4.1 | | |
| Example 196 | | 2.8 | |

TABLE 42

The binding of ethanolamine to azlactone graft copolymers.

| | Ethanolamine Bound (nmol/cm²) | | |
|---|---|---|---|
| Film | KAPTON ™ | TEFLON ™ | Chrome |
| EVA Control EVA/VDM | 1.02 | 3.32 | 0.88 |
| Example 197 | 3.66 | | |
| Example 198 | | 2.98 | |
| Example 199 | | | 4.16 |
| PE Contol PE/VDM | 0.10 | 0.58 | — |

TABLE 42-continued

The binding of ethanolamine to azlactone graft copolymers.

| | Ethanolamine Bound (nmol/cm²) | | |
|---|---|---|---|
| Film | KAPTON ™ | TEFLON ™ | Chrome |
| Example 200 | 2.30 | | |
| Example 201 | | 1.14 | |
| PP Control PP/VDM | — | 0.074 | — |
| Example 202 | 0.35 | | |
| PS Contol PS/VDM | — | 0.48 | — |
| Example 203 | | 1.32 | |

TABLE 43

The binding of lysine to azlactone graft copolymer

| | Lysine Bound (nmol/cm²) | | |
|---|---|---|---|
| Film | KAPTON ™ | TEFLON ™ | Chrome |
| EVA Control EVA/VDM | 1.02 | 3.32 | 0.88 |
| Example 204 | 3.66 | | |
| Example 205 | | 2.98 | |
| Example 206 | | | 4.16 |
| PE Control PE/VDM | 0.10 | 0.58 | — |
| Example 207 | 2.30 | | |
| Example 208 | | 1.14 | |
| PP Control PP/VDM | — | 0.074 | — |
| Example 209 | 0.35 | | |
| PS Control PS/VDM | — | 0.48 | — |
| Example 210 | | 1.32 | |

In contrast to the protein results, the results in TABLES 41–43 show that forming against chrome results in high density binding of low molecular weight amines to VDM grafts of PE, PP, and PS.

Examples 211–212

The results below demonstrate the binding of antibody to PE test tubes formed against stainless steel and TEFLON ™ -coated molding pins.

A 10×75 mm test tube molding die was used to make test tubes from control PE and PE/VDM. Some tubes were prepared using the stainless steel molding pin as manufactured and others were molded using an identical pin coated with TEFLON ™. Tubes were manufactured under low humidity conditions (<25% relative humidity) and stored in desiccators until used.

Rat anti-mouse IgG$_2$ antibody was iodinated using the procedure described in Example 46 above, and allowed to incubate in the test tubes in physiological saline or 0.75 M sodium sulfate. 150 μL of antibody solution was added to each tube. Three concentrations of antibody were tested (0.25, 0.79, and 2.5 mg/mL). Specific radioactivities of the antibody solutions were from 4700 to 4900 cpm/μg SDS denaturation was carried out according to the general method of Examples 57 and 58 above.

TABLE 44 shows the results for the studies with physiological saline and 2.5 mg/mL antibody. All the results show a similar significant difference between the stainless steel and TEFLON TM -coated pins.

TABLE 44

Irreversibly bound antibody to PE and PE/VDM as a function of the surface of the molding pin.

| Molding Pin | Irreversibly Bound Antibody (μg/cm²) | |
|---|---|---|
| | PE Control | PE/VDM |
| Stainless Steel (Example 211) | 1.1 | 4.1 |
| TEFLON TM (Example 212) | 1.9 | 7.5 |

The data in TABLE 44 indicate that irreversible binding (net binding after the sodium dodecylsulfate denaturation step) is increased by the TEFLON TM coating on the molding pin. Furthermore, although not noted in TABLE 44 the initial binding (adsorption plus irreversible binding) also is increased by forming against TEFLON TM. For example, for PE/VDM, the use of a TEFLON TM pin causes 68% increase in initial binding of antibody relative to the stainless steel pin (5.3 μg/cm² vs. 8.9 μg/cm²).

Examples 213-218

These examples demonstrate the use of an azlactone graft copolymer as a polymer blend compatibilizing agent.

The graft copolymer of Example 1 was blended in a BRABENDER TM mixer with polypropylene (DYPRO TM 8771, commercially available from Fina, Houston, Tex.) and polymethylmethacrylate (PMMA, ELVACITE TM 2008, DuPont), for 15 minutes at 200° C. TABLE 45 below lists the samples that were made.

TABLE 45

| Example | PP/PMMA (wt %) | Ex 1 Copolymer (wt %) |
|---|---|---|
| Control | 95/5 | 0 |
| 213 | 95/5 | 2 |
| 214 | 95/5 | 5 |
| 215 | 95/5 | 10 |
| Control | 80/20 | 0 |
| 216 | 80/20 | 2 |
| 217 | 80/20 | 5 |
| 218 | 80/20 | 10 |

The resulting blends were then pressed into 0.13 mm thick films between TEFLON TM coated aluminum plates at 200° C. using about 10 grams of the each blend at a pressure of about 41.4 kPa for 30 seconds using a WABASH TM heated press. The pressed samples were quenched from the molten state to the solid state in a room temperature water bath. Tensile properties were measured for each of the comparative example blend films and the compatibilized blend films of the invention. The tensile measurements were made on an INSTRON TM 1122 tensile testing machine using a 2"×½" (5.1 cm×1.2 cm) sample size at a strain of 100% per minute [2" (5 cm) per minute] and using ASTM D882-31. Tensile strength and the 0.5 and 1.0% modulii are shown in TABLE 46.

TABLE 46

Tensile Values for the PP/PMMA/Graft Copolymer Blends.

| Example | PP/PMMA (wt %) | Ex. 1 (wt %) | Tensile Strength | 0.5% Mod ($\times 10^{-5}$) | 1.0% Mod ($\times 10^{-5}$) |
|---|---|---|---|---|---|
| Control | 95/5 | 0 | 3139 psi (21.64 mPa) | 0.44 | 0.79 |
| 213 | 95/5 | 2 | 4149 psi (28.60 mPa) | 1.80 | 1.80 |
| 214 | 95/5 | 5 | 4078 psi (28.11 mPa) | 1.70 | 1.70 |
| 215 | 95/5 | 10 | 3954 psi (27.26 mPa) | 1.70 | 1.70 |
| Control | 80/20 | 0 | 3307 psi (22.80 mPa) | 1.20 | 1.40 |
| 216 | 80/20 | 2 | 3547 psi (24.45 mPa) | 1.20 | 1.50 |
| 217 | 80/20 | 5 | 4109 psi (28.33 mPa) | 1.20 | 1.60 |
| 218 | 80/20 | 10 | 3930 psi (27.09 mPa) | 1.70 | 1.90 |

The results in TABLE 46 indicate that there is an increase in the tensile properties of the blends containing the graft copolymer. Because the tensile strength of a film of the graft polymer of Example 1 is only 3552 psi (24.49 mPa), we believe the added strength is due to improved adhesion between the PP phase of the graft copolymer with PP and the azlactone phase of the graft copolymer with the carbonyl portion of the PMMA.

Examples 219-224

These Examples show the effect that quenching a graft copolymer of the invention in an inert quenching liquid has upon the ability of the graft copolymer to irreversibly bind protein.

PP/VDM graft copolymers were prepared according to the general method of Examples 67-71 using the particular conditions set forth in TABLE 47 below.

TABL 47

| | Example | | | | | |
|---|---|---|---|---|---|---|
| | 219 | 220 | 221 | 222 | 223 | 224 |
| Condition | | | | | | |
| Flow Rate (g/min) | 38.9 | 41.5 | 41.7 | 42.0 | 39.3 | 40.7 |
| Reaction Temp (°C.) | 180 | 180 | 180 | 180 | 200 | 220 |
| RPMs | 100 | 100 | 100 | 100 | 100 | 100 |
| VDM (g/min) | 1.1 | 1.1 | 3.5 | 3.5 | 2.1 | 1.1 |
| VDM (wt %) | 2.8 | 2.6 | 8.4 | 8.3 | 5.3 | 2.7 |
| Init (g/min) | 0.04 | 0.22 | 0.04 | 0.22 | 0.13 | 0.04 |
| Init (wt %) | 0.10 | 0.52 | 0.10 | 0.52 | 0.33 | 0.10 |
| Temperatures (°C.) | | | | | | |
| Zone 1 | 184 | 184 | 185 | 184 | 192 | 193 |
| 2 | 175 | 175 | 174 | 175 | 197 | 195 |
| 3 | 180 | 181 | 179 | 172 | 205 | 220 |
| 4 | 182 | 182 | 183 | 180 | 200 | 230 |
| 5 | 177 | 177 | 176 | 176 | 196 | 217 |
| 6 | 178 | 177 | 178 | 177 | 195 | 218 |
| 7 | 177 | 182 | 183 | 182 | 202 | 220 |
| 8 | 203 | 204 | 212 | 211 | 212 | 237 |
| 9 | 184 | 184 | 183 | 184 | 205 | 223 |
| Block (10) | 172 | 172 | 170 | 169 | 180 | 174 |

A film of the graft copolymer of Example 222 was prepared by pressing between chrome surfaces as described in Example 125 above. Kjeldahl analysis of the graft copolymer indicated that the graft copolymer comprised 0.59 percent nitrogen by weight, while ESCA surface analysis indicated that the surface comprises 0.82 percent nitrogen by weight.

Transmission IR spectral analysis of the pressed film showed a strong absorbance at 1825 cm$^{-1}$ and substantially no absorbance at 1539 cm$^{-1}$, indicating the presence of a relatively high concentration of azlactone and only a small amount of the amide-containing hydrolysis product.

EXAMPLE 225-231

Films of the graft copolymers of Examples 44 and 219-224 above and of polypropylene as a control were pressed between polytetrafluoroethylene surfaces as described in Example 125 above. Protein binding studies were carried out as described in Examples 72-81 above using pH 9.0 sodium pyrophosphate buffer in 1.5 M sodium sulfate and radiolabeled Protein A with a specific radioactivity of 2220 cpm/μg. The results are shown in TABLE 48 below.

TABLE 48

Effect of Inert Quench on Protein A Binding

| Example | Polymer Sample | Protein Bound (μg/cm²) | SDS Resistance (%) | Irreversible Binding (μg/cm²) |
| --- | --- | --- | --- | --- |
| — | PP Control | 0.24 | 22 | 0.05 |
| 225 | Example 44 | 0.33 | 29 | 0.095 |
| 226 | Example 219 | 0.44 | 90 | 0.40 |
| 227 | Example 220 | 0.49 | 93 | 0.45 |
| 228 | Example 221 | 0.47 | 85 | 0.40 |
| 239 | Example 222 | 0.46 | 92 | 0.43 |
| 230 | Example 223 | 0.48 | 89 | 0.43 |
| 231 | Example 224 | 0.48 | 84 | 0.41 |

The data in TABLE 48 show that quenching in an inert quenching liquid ultimately results in greater total binding of protein and greater irreversible binding of protein compared to quenching in water (i.e., compared to the results obtained with the material of Example 44).

Examples 232-237

Blends of the graft copolymers of Examples 44 and 45 were blended with their respective base polymers, polypropylene (FINA PP 3576X, FINA, Houston, Tex.) and polystyrene (Dow STYRON ™ 685-026, Dow Chemical, Midland, Mich.), at various amounts by weight as indicated in TABLE 49 below. The blending was done by feeding the components of the polymer blends into a Baker Perclus corotating twin screw extender (50mm, L/O=10:1, available from APV, Inc., Saginaw, Mich.) using a K-TRON ™ T-35 volumetric feeder (available from K-tron Corp., Pitman, N.J.). The blending was performed at a melt temperature of 204° C. The blended melt was extruded as a strand into a room temperature water bath and pelletized as in Example 1.

TABLE 49

Graft Copolymer/Base Polymer Blends

| Example | Base Polymer (parts by weight) | Graft Copolymer (parts by weight) |
| --- | --- | --- |
| 232 | PP (100) | PP/VDM (67) |
| 233 | PP (100) | PP/VDM (33) |
| 234 | PP (100) | PP/VDM (9.9) |
| 235 | PS (100) | PS/VDM (67) |
| 236 | PS (100) | PS/VDM (33) |
| 237 | PS (100) | PS/VDM (9.9) |

Examples 238-245

Films of the blends of Examples 232-237 were pressed between polytetrafluoroethylene surfaces as described in Examples 123-126 above. Films of the respective base polymers and graft copolymers of Examples 44 and 45 were similarly pressed. Protein binding studies were done as described in Examples 72-81 above, using pH 7.4 buffer in 1.5 M sodium sulfate solution and radiolabeled Protein A with a specific radioactivity of 2400 cpm/μg. The amount of irreversibly bound protein is shown in TABLE 50 below.

TABLE 50

Irreversible Protein Binding in Graft Copolymer/Base Polymer Blends

| Example | Polymer Sample | Irreversibly Bound Protein A (μg/cm²) |
| --- | --- | --- |
| 238 | Example 44 | 0.074 |
| 239 | Example 232 | 0.055 |
| 240 | Example 233 | 0.050 |
| 241 | Example 234 | 0.041 |
| — | PP Control | 0.040 |
| 242 | Example 45 | 0.150 |
| 243 | Example 235 | 0.081 |
| 244 | Example 236 | 0.080 |
| 245 | Example 237 | 0.058 |
| — | PS Control | 0.056 |

The results in TABLE 50 show that graft copolymer/base polymer blends retain the protein-binding ability of the graft copolymer.

Various modifications and alterations of this invention will be apparent to those skilled in the art without departing from the scope and spirit of this invention. This invention should not be restricted to those embodiments set forth herein for illustrative purposes.

The claimed invention is:

1. A graft copolymer comprising a polyolefin base polymer which base polymer undergoes substantial crosslinking under polymer melt conditions in the presence of a free radical initiator, having grafted thereon a monomeric 2-alkenyl azlactone of the formula

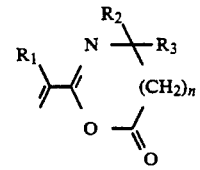

wherein $R_1$ is hydrogen, or methyl, $R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and n is an integer 0 to 1, 2. A graft copolymer according to claim 1, wherein the base polymer is selected from the group consisting of polyethylene, polybutadiene, and ethylene/vinylacetate copolymer.

3. A graft copolymer according to claim 1, wherein n is zero.

4. A graft copolymer according to claim 1, wherein the 2-alkenyl azlactone is selected from the group consisting of
2-ethenyl-1,3-oxazoline-5-one,
2-ethenyl-4-methyl-1,3-oxazolin-5-one,
2-isopropenyl-1,3-oxazolin-5-one,
2-isopropenyl-4-methyl-1,3-oxazolin-5-one,
2-ethenyl-4-methyl-4-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl-4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-4-methyl-4-phenyl-1,3-oxazolin-5-one,
2-isopropenyl-4-methyl-4-benzyl-1,3-oxazolin-5-one, and
2-ethenyl-4,4-pentamethylene-1,3-oxazolin-5-one, 5. A graft copolymer according to claim 1, wherein the 2-alkenyl azlactone is 2-ethenyl-4,4-dimethyl-1,3-oxazolin-5-one.

6. A graft copolymer according to claim 1, wherein the 2-alkenyl azlactone is 2-isopropenyl-4,4-dimethyl-1,3-oxazolin-5-one.

7. A graft copolymer according to claim 1, comprising grafted 2-alkenyl azlactone in an amount sufficient to impart to the graft copolymer the reactivity of the azlactone moiety.

8. A graft copolymer according to claim 1, comprising about 0.1% to about 20% by weight of grafted 2-alkenyl azlactone.

9. A graft copolymer according to claim 1, comprising about 0.1% to about 20% by weight of grafted 2-alkenyl azlactone.

10. A graft copolymer according to claim 1, comprising about 0.5% to about 10% by weight of grafted 2-alkenyl azlactone.

11. A process of preparing graft copolymer with a protein bound to the surface thereof, comprising contacting the surface of a graft copolymer according to claim 1 with a protein.

12. A process according to claim 11, wherein the protein is an antibody.

13. A process according to claim 12, wherein the antibody is an anti-IgE or an anti-IgG.

14. A process according to claim 12, wherein the graft copolymer is in the form of an article selected from the group consisting of a microtiter well, a test tube, a film, and a bead.

15. A process according to claim 11, wherein the protein is Protein A.

16. A polymer blend comprising: (i) a graft copolymer according to claim 1 in an amount effective to impart to the blend the reactivity of the azlactone moiety; and (ii) the base polymer of the graft copolymer.

17. A polymer blend according to claim 16, wherein the graft copolymer is present in an amount of at least about 1 percent by weight based on the weight of the based polymer.

18. A polymer blend according to claim 16, wherein the graft 10 percent by weight based on the weight of least about 10 percent by weight based on the weight of the base polymer.

19. A polymer blend according to claim 16, wherein the graft copolymer is present in an amount of at least about 30 percent by weight based on the weight of the base polymer.

20. A process for preparing an azlactone graft copolymer which process comprises the steps of:
(1) feeding to a reactor materials comprising
 (a) a polyolefin base polymer
 (b) an effective amount of a free radical initiator system comprising one or more free radical initiators; and
 (c) a monomeric 2-alkenyl azlactone of the formula

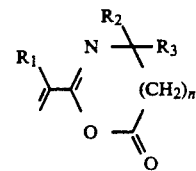

wherein
$R_1$ is hydrogen, or methyl,
$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and
n is an integer 0 or 1, wherein the materials are substantially free of oxygen;
(2) reacting the materials in the reactor to provide a graft copolymer comprising the base polymer with 2-alkenyl azlactone moieties grafted thereon; and
(3) withdrawing the graft copolymer from the reactor.

21. A process according to claim 20, further comprising the step of quenching the graft copolymer in a quenching liquid that is inert to the azlactone.

22. A process according to claim 20, wherein the 2-alkenyl azlactone is fed into the reactor in an amount sufficient to provide a graft copolymer comprising grafted 2-alkenyl azlactone in an amount sufficient to impart to the graft copolymer the reactivity of the azlactone moiety.

23. A process according to claim 20, wherein the 2-alkenyl azlactone is fed into the reactor in an amount sufficient to provide a graft copolymer comprising about 0.001 to 20 weight percent grafted 2-alkenyl azlactone.

24. A process according to claim 20, wherein about 0.1% to about 1% by weight of the initiator system based on the weight of the base polymer is fed into the reactor.

25. A process according to claim 20, wherein about 0.25% to about 0.50% by weight of the initiator system based on the weight of the base polymer is fed into the reactor.

26. A process according to claim 20, wherein the initiator system comprises at least two initiators.

27. A process according to claim 25, wherein each initiator of the initiator system has a decomposition rate significantly different from the decomposition rates of the other initiator(s) in the initiator system.

28. A process according to claim 27, wherein the initiator system comprises from about 40% to about 60% of 2,5-dimethyl-2,5-di(t-butylperoxy)hexane and from about 60% to about 40% of 2,5-dimethyl-2,5-di(t-butylperoxy)hex-3-yne.

29. A process according to claim 20, wherein the reactor is a wiped-surface reactor.

30. A process according to claim 20, wherein the reactor is starve-fed.

31. A process according to claim 20, wherein the initiator system is fed in a region of the reactor subsequent to the region in which the base polymer is fed.

32. A graft copolymer comprising a polyolefin base polymer having grafted thereon a monomeric 2-alkenyl azlactone of the formula

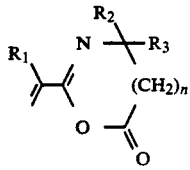

wherein $R_1$ is hydrogen, or methyl;

$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and n is an integer of 0 or 1; with a protein bound to the surface thereof.

33. A graft copolymer according to claim 32, wherein the protein is an antibody.

34. A graft copolymer according to claim 33, wherein the antibody is an anti-IgE or an anti-IgG.

35. A graft copolymer according to claim 32, wherein the protein is Protein A.

36. A graft copolymer according to claim 32, in the form of an article selected from the group consisting of a microtiter well, a test tube, a film, and a bead.

37. A method of immunoassay comprising the steps of:

1) treating an article comprising a graft copolymer comprising a polyolefin base polymer having grafted thereon a monomeric 2-alkenyl azlactone of the formula

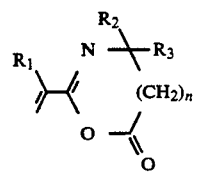

wherein $R_1$ is hydrogen, or methyl;

$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and n is an integer of 0 or 1;

with one member of an immunological pair;

2) incubating the treated article with a solution suspected of containing the second member of the immunological pair; and 3) determining the amount of the second member of the immunological pair present in the solution.

38. A graft copolymer comprising a polyolefin base polymer having grafted thereon a monomeric 2-alkenyl azlactone of the formula

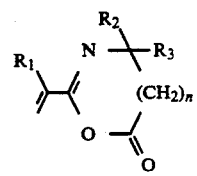

wherein $R_1$ is hydrogen, or methyl;

$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3S, N, or nonperoxidic O atoms, or $R_2$ and $R_3$ taken, together with the carbon to which they are joined can form a carbocyclic ring containing 4 to 12 ring atoms, and n is an integer of 0 or 1; having bound thereto a moiety capable of modifying the surface properties of the graft copolymer.

39. A graft according to claim 38, wherein the moiety comprises a fluoroaliphatic moiety, an acidic moiety, an aliphatic hydrocarbon moiety, an aromatic hydrocarbon moiety, a zwitterionic moiety, a surface active moiety, or a nucleophilic moiety.

40. A graft copolymer according to claim 39, wherein the moiety is bound to the surface of the graft copolymer.

41. A method of modifying the surface properties of a graft copolymer comprising a polyolefin base polymer having grafted thereon a monomeric 2-alkenyl azlactone of the formula

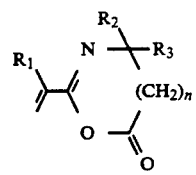

wherein $R_1$ is hydrogen, or methyl;

$R_2$ and $R_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or $R_2$ and $R_3$ taken together with the carbon to which they are joined can form a carbocyclic ring containing 4 to 12 ring atoms, and n is an integer of 0 or 1; comprising contacting the graft copolymer with a reagent comprising a nucleophilic functional group and a group capable of modifying the surface properties of the graft copolymer, at a temperature and for a time sufficient to cause the reagent to bind to the graft copolymer.

42. A forming method for controlling the amount of grafted azlactone at the surface of a composition comprising a graft copolymer comprising a polyolefin base polymer having grafted thereon a monomeric 2-alkenyl azlactone of the formula

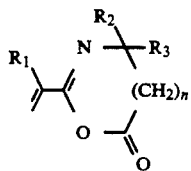

wherein
R$_1$ is hydrogen, or methyl;
R$_2$ and R$_3$ are independently alkyl having 1 to 14 carbon atoms, cycloalkyl having 3 to 14 carbon atoms, aryl having 5 to 12 ring atoms, arenyl having 6 to 26 carbon, and 0 to 3 S, N, or nonperoxidic O atoms, or R$_2$ and R$_3$ taken together with the carbon to which they are joined can form a carbocyclic rig containing 4 to 12 ring atoms, and
n is an integer of 0 or 1; comprising the steps of:
 (1) selecting a forming surface that is made of a material that will control the amount of grafted azlactone at the surface of the composition;
 (2) forming the composition in a molten state against the surface selected in step (1); and
 (3) quenching the composition to the solid state.

43. A method according to claim 42, wherein the forming surface is selected from the group consisting of polytetrafluoroethylene, chrome, and a polyimide.

44. A forming method for controlling the relative level of reactivity of the surface of a composition comprising a graft copolymer comprising a polyolefin base polymer having grafted thereon a monomeric 2-alkenyl azlactone of the formula

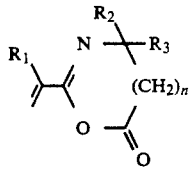

wherein
R$_1$ is hydrogen, or methyl;
R$_2$ and R$_3$ are independently alkyl having 1 to 14 carbon atoms, cycloalkyl having 3 to 14 carbon atoms, aryl having 5 to 12 ring atoms, arenyl having 6 to 26 carbon, and 0 to 3 Sn, N, or nonperoxidic O atoms, or R$_2$ and R$_3$ taken together with the carbon to which they are joined can form a carbocyclic ring containing 4 to 12 ring atoms, and n is an integer of 0 or 1; toward a nucleophilic reagent, comprising the steps of:
 (1) selecting a forming surface that is made of a material that will impart to the surface of the graft copolymer the desired relative level of reactivity;
 (2) forming the graft copolymer in a molten state against the surface selected in step (1); and
 (3) quenching the graft copolymer to the solid state.

45. A method according to claim 44, wherein the nucleophilic reagent is a protein and the forming surface is polytetrafluoroethylene.

46. A method according to claim 44, wherein the nucleophilic reagent has a molecular weight of less than about 1000 and the surface is chrome or a polyimide.

47. A compatibilized immiscible polymer blend, comprising an immiscible polymer blend in intimate admixture with an amount of a graft copolymer comprising a polyolefin base polymer having grafted thereon a monomeric 2-alkenyl azlactone of the formula

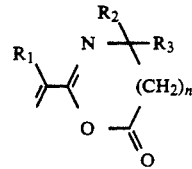

wherein
R$_1$ is hydrogen, or methyl;
R$_2$ and R$_3$ are independently alkyl having 1 to 14 carbon atoms, cycloalkyl having 3 to 14 carbon atoms, aryl having 5 to 12 ring atoms, arenyl having 6 to 26 carbon, and 0 to S, N, or nonperoxidic O atoms, or R$_2$ and R$_3$ taken together with the carbon to which they are joined can form a carbocyclic ring containing 4 to 12 ring atoms, and
n is an integer of 0 or 1; effective to increase the tensile strength of the immiscible blend.

48. A compatibilized blend according to claim 47, comprising about 1 to about 10 percent by weight of the graft copolymer based on the total weight of the compatibilized blend.

49. A compatibilized blend according to claim 47, comprising about 2 to about 5 percent by weight of the graft copolymer based on the total weight of the compatibilized blend.

50. A compatibilized blend according to claim 47, where the immiscible polymer blend is a polymethylmethacrylate/polypropylene blend.

51. A compatibilized blend according to claim 50, wherein the polymethyl methacrylate/polypropylene blend comprises about 80 to about 99 percent by weight polypropylene based on the total weight of the blend, and about 5 percent to about 20 percent by weight polymethyl methacrylate based on the total weight of the polymethyl methacrylate/polypropylene blend.

* * * * *

UNITED STATES PATENT AND TRADEMARK OFFICE
CERTIFICATE OF CORRECTION

PATENT NO. : 5,262,484
DATED : November 16, 1993
INVENTOR(S) : Patrick L. Coleman, Thomas A. Kotnour, Richard J. Rolando It is certified that error appears in the above-indentified patent and that said Letters Patent is hereby corrected as shown below:

| | |
|---|---|
| Col. 2, line 57 | "ELI$A" should read --ELISA-- |
| Col. 15, line 8 | "pressuresensitive" should read --pressure-sensitive-- |
| Col. 15, line 38 | "great" should read --graft-- |
| Col. 30, line 27 | "FE/VDM" should read --PE/VDM-- |
| Col. 33, line 15 | after "As" insert --further evidence of azlactone incorporation, there is also-- |
| Col. 35, line 68 | "sing" should read --hot-pressing-- |
| Col. 37, line 22 | "FE" should read --PE-- |
| Col. 38, line 44 | "KAPTONυ" should read --KAPTON™-- |
| Col. 43, line 6 | after "4900 cpm/$\mu$g" insert --.-- |
| Col. 47, line 34 | "0.1%" should read --0.001%-- |
| Col. 47, line 66 | delete "10 percent by weight based on the weight" |
| Col. 47, line 66 | after "graft" insert --copolymer is present in an amount-- |
| Col. 51, line 25 | "rig" should read --ring-- |

UNITED STATES PATENT AND TRADEMARK OFFICE
CERTIFICATE OF CORRECTION

PATENT NO. : 5,262,484

DATED : November 16, 1993

INVENTOR(S) : Patrick L. Coleman, Thomas A. Kotnour, Richard J. Rolando

It is certified that error appears in the above-indentified patent and that said Letters Patent is hereby corrected as shown below:

Col. 51, line 56   "Sn," should read --S,--

Col. 52, line 36   after "to" insert --3--

Signed and Sealed this

Sixth Day of September, 1994

Attest:

BRUCE LEHMAN

Attesting Officer    Commissioner of Patents and Trademarks